(12) United States Patent
Guilford et al.

(10) Patent No.: US 12,494,800 B2
(45) Date of Patent: Dec. 9, 2025

(54) APPARATUS AND METHOD FOR CONSTANT DETECTION DURING COMPRESS OPERATIONS

(71) Applicant: Intel Corporation, Santa Clara, CA (US)

(72) Inventors: James David Guilford, Northborough, MA (US); Vinodh Gopal, Westborough, MA (US); Daniel Frederick Cutter, Maynard, MA (US); Kirk Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 17/559,989

(22) Filed: Dec. 22, 2021

(65) Prior Publication Data

US 2023/0198548 A1 Jun. 22, 2023

(51) Int. Cl.
*H03M 7/30* (2006.01)
*G06F 3/06* (2006.01)

(52) U.S. Cl.
CPC ........ *H03M 7/3084* (2013.01); *G06F 3/0608* (2013.01); *G06F 3/0641* (2013.01); *G06F 3/0679* (2013.01)

(58) Field of Classification Search
CPC ....... H03M 7/3084; H03M 7/40; G06F 12/04; G06F 12/023; G06F 3/0679; G06F 3/0608; G06F 3/0641
See application file for complete search history.

(56) References Cited

U.S. PATENT DOCUMENTS

| | | | | |
|---|---|---|---|---|
| 6,191,710 B1* | 2/2001 | Waletzki | ................ | H03M 7/30 341/63 |
| 10,489,160 B2* | 11/2019 | Hirsch | ................ | H03M 7/3084 |
| 2008/0288436 A1* | 11/2008 | Priya N V | .......... | G06F 12/0246 706/48 |
| 2010/0218064 A1* | 8/2010 | Ito | ....................... | G11C 11/5621 711/E12.001 |

(Continued)

FOREIGN PATENT DOCUMENTS

DE 102022129890 A1 6/2023

OTHER PUBLICATIONS

Lagar-Cavilla et al., "Software-Defined Far Memory in Warehouse-Scale Computers", ASPLOS '19, Apr. 13-17, 2019, 14 pages.

(Continued)

*Primary Examiner* — Reginald G Bragdon
(74) *Attorney, Agent, or Firm* — NICHOLSON DE VOS WEBSTER & ELLIOTT LLP

(57) ABSTRACT

Apparatus and method for detecting a constant data block are described herein. An apparatus embodiment includes compression circuitry to perform compression operations on a memory block; constant detection circuitry to, concurrently with performance of the compression operations on the memory block, determine that the memory block is a constant data block comprised of only repeat instances of a constant value; and controller circuitry to associate a first indication with the memory block based on the determination, the first indication usable for controlling whether to abort the compression operations or whether to discard a compressed memory block generated from the compression operations.

25 Claims, 21 Drawing Sheets

(56) References Cited

U.S. PATENT DOCUMENTS

2019/0095112 A1* 3/2019 Lingarajappa ...... G06F 12/1408
2019/0123763 A1* 4/2019 Bissessur .......... G06F 16/24568
2020/0143509 A1 5/2020 Morphet
2020/0257452 A1* 8/2020 Oh ....................... G06F 3/0647
2021/0349761 A1 11/2021 Rangan et al.
2022/0222075 A1 7/2022 Pawlowski et al.

OTHER PUBLICATIONS

European Search Report and Search Opinion, EP App. No. 22203546.1, May 23, 2023, 10 pages.
Intention to Grant, EP App. No. 22203546.1, Sep. 9, 2024, 8 pages.

* cited by examiner

| N BITS | N-BIT REFERENCE VALUE |
|---|---|
| 1 BIT | REFERENCE VALUE VALID |
| 1 BIT | DIFFERENT VALUES ALREADY SEEN |

402 — N-BIT REFERENCE VALUE
404 — REFERENCE VALUE VALID
406 — DIFFERENT VALUES ALREADY SEEN

| VALID | SEEN | INTERPRETATION |
|---|---|---|
| 0 | 0 | REFERENCE VALUE IGNORED, NOTHING PREVIOUSLY SEEN |
| 1 | 0 | REFERENCE VALUE VALID, PREVIOUS INPUTS ALL EQUAL TO THIS VALUE |
| X | 1 | REFERENCE VALUE DOES NOT MATTER, MULTIPLE VALUES ALREADY SEEN |

Compress Descriptor

| Byte 7 | Byte 6 | Byte 5 | Byte 4 | Byte 3 | Byte 2 | Byte 1 | Byte 0 | bytes |
|---|---|---|---|---|---|---|---|---|
| Operation | Operation Flags | | | Reserved | | PASID | | 0 |
| Completion Record Address | | | | | | | | 8 |
| Source 1 Address | | | | | | | | 16 |
| Destination Address | | | | | | | | 24 |
| Compression Flags | | Completion Interrupt Handle | | Source 1 Transfer Size | | | | 32 |
| Source 2 Transfer Size | | | Source 2 Address | | | | | 40 |
| Reserved | | | | Maximum Destination Size | | | | 48 |
| | | | | | Compression 2 Flags | | | 56 |

1010

Completion Record

| Byte 7 | Byte 6 | Byte 5 | Byte 4 | Byte 3 | Byte 2 | Byte 1 | Byte 0 | bytes |
|---|---|---|---|---|---|---|---|---|
| Bytes Completed | | | | Unused | | Error code | Status | 0 |
| Fault Address | | | | | | | | 8 |
| XOR Checksum | | Unused | Output Bits | | Invalid Flags | | | 16 |
| Unused | | | | | Output Size | | | 24 |
| Min / First | | | | | CRC | | | 32 |
| Sum / Population count | | | | | Max / Last | | | 40 |
| Crypto Hash Low | | | | | | | | 48 |
| Crypto Hash High | | | | | | | | 56 |

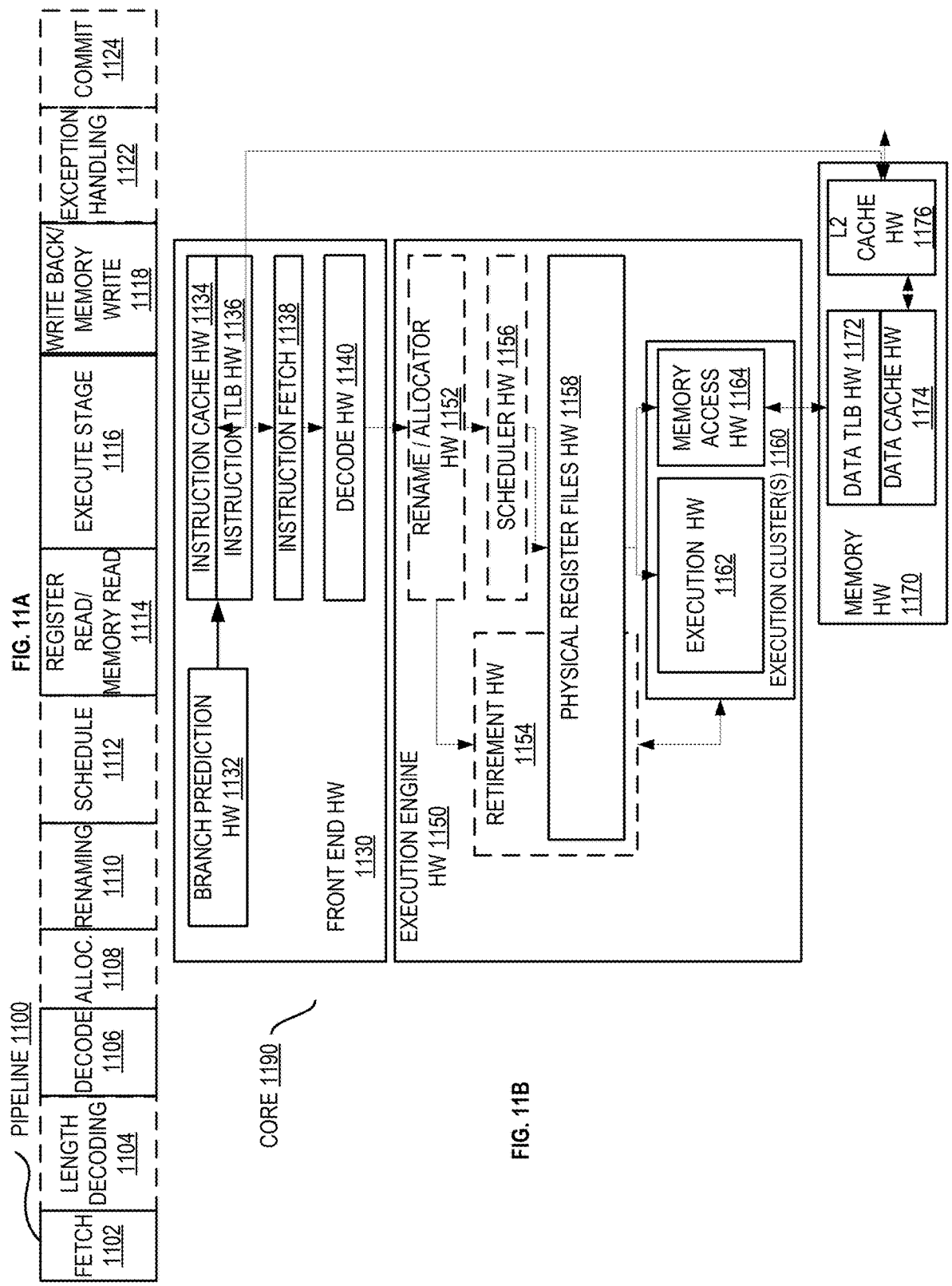

APPARATUS AND METHOD FOR CONSTANT DETECTION DURING COMPRESS OPERATIONS

TECHNICAL FIELD

Embodiments of the invention described herein relate generally to the optimization of data compression operations. In particular, the disclosure relates to architecture extension for the detection of constant(s) during data compression operations.

BACKGROUND ART

The use of compression at the page level to create memory hierarchy or tiers, such as in a Linux ZSWAP implementation, is becoming increasingly important. During memory page swaps, instead of sending swapped pages out to disk, they are compressed and stored in memory. The idea is to increase the effective memory capacity while achieving better performance than swapping directly to a slower memory tier. The ideal performance goal is to maximize the memory savings via page compression while minimizing the performance impacts to applications when compared to systems that utilize large memory capacity but with no compression. The key requirement to achieving this, of course, is low latency compression and decompression.

Typically, systems that utilize compression at the page level tend to use relatively lightweight compression algorithms such as Lempel-Ziv-Oberhumer (LZO). This class of algorithms has the advantage of higher speed at the cost of reduced compression. Studies have shown that the use of software-based LZO typically yields a modest amount (~4%) of memory savings. Other more aggressive algorithms, such as Deflate, offer better compression ratios but suffer from increased compression and decompression latencies. These more aggressive algorithms also tend to make software-based implementation difficult. Any optimization that can improve the latencies associated with compression/decompression operations is therefore highly desirable.

BRIEF DESCRIPTION OF THE DRAWINGS

The invention may best be understood by referring to the following description and accompanying drawings that are used to illustrate embodiments of the invention. In the drawings:

FIG. 4 illustrates fields for preserving partial states during the performance of constant detection operations in accordance with an embodiment;

FIG. 10 illustrates details of a job descriptor and a completion record in accordance with an embodiment;

FIG. 11A is a block diagram illustrating both an exemplary in-order pipeline and an exemplary register renaming, out-of-order issue/execution pipeline according to embodiments of the invention;

FIG. 11B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1A:
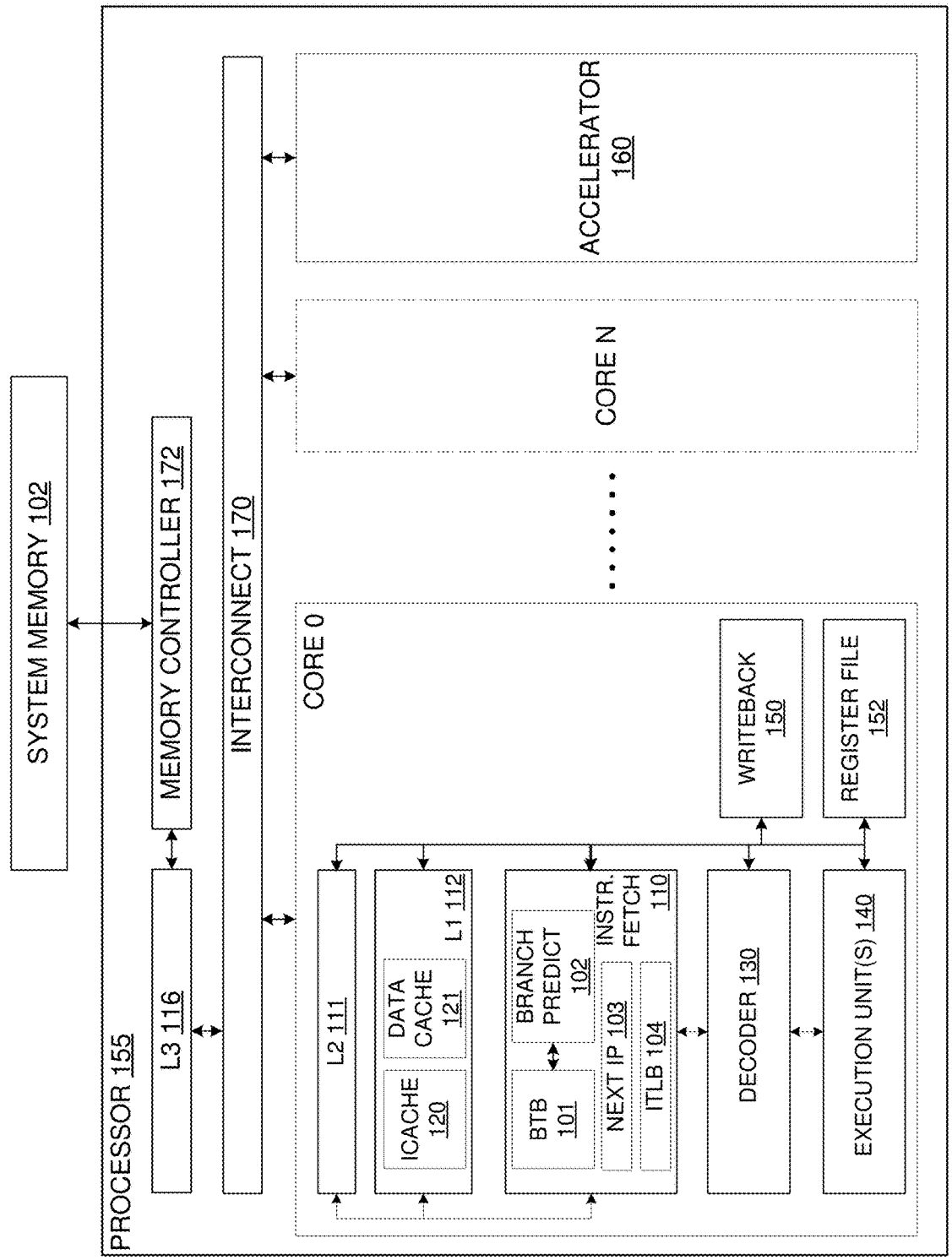
FIG. 1A is a block diagram illustrating an exemplary processor on which embodiments of the present invention may be implemented.

Embodiments of apparatus and method for detecting constant value(s) in a data block during the compression of that data block are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

In typical memory usage, a significant number of the memory pages, also referred to herein as memory blocks or data blocks, are comprised of repeat instances of the same bit sequence (e.g., a constant value). For example, a typical memory page of 4096 bytes (4 KB) can include 4096 (4K) instances of the same constant byte (e.g., 0x00 or 0xFF). Because of their repetitive nature, performing compression and/or decompression on these memory pages use up valuable resources that could otherwise be saved.

Embodiments of the present invention advantageously improves the compression and decompression performance for memory page with minimal area cost and design complexity. For example, an accelerator that performs compression operation may be augmented with a new constant detect functionality. During a compression operation, such as Deflate compression or any nested compression method, the input data block or stream is checked to see if it contains the same constant value over and over. An indication is then associated with the data block based on the result. For example, an aggregate field in a completion record may be updated with the result of the check. Thereafter, the OS or system software can check that field and intelligently decide whether to keep the compressed data block or to represent it with meta-data signaling a constant data block. The constant detection feature may be enabled across multiple jobs via save/restore state.

According to an embodiment, instead of compressing a constant data block with a compression algorithm and storing them in memory, a few extra bits of metadata is maintained in a data structure to identify these data blocks as special blocks of constants which can be regenerated from much less stored data. This not only decreases the latency associated with compression and decompression, but also improves the compressibility as less memory footprint is required for storage.

According to an embodiment, a constant detect functionality is added to augment the compression operations performed by a hardware accelerator. For example, a check may be performed on an input data block or data stream to see if it is made up of repeat instances of the same constant, which can be a bit string of any specified length (e.g., byte (8-bits), word (16-bits), doubleword (32-bits), etc.). If the data block is comprised of only repeat instances of the same constant, it is considered a constant data block. Conversely, if the data block includes values other than the same constant, it is not a constant data block.

The check for repeating constants in a data block, according to an embodiment, is performed separately from its compression. Accordingly, the check may be performed at any time before, after, or during the compression of the data block. In some embodiments, the result of the check is provided as supplemental information associated with the data block and is usable by the operating system (OS) or other system software/hardware to control subsequent operations (e.g., storage, decompression, etc.) associated therewith. For example, according to an embodiment, if the result of the constant detection indicates that the data block is not a constant data block, the compression operations proceed as normal and the compressed data block is stored to the memory hierarchy (e.g., system memory or cache). On the other hand, if the result indicates that the data block is a constant data block, information (e.g., metadata) may be associated or attached to the data block to signal to the OS and/or other system software/hardware that the compressed form of the data block may be discarded to save or free up memory space. In addition, metadata may be stored in a data structure (e.g., a directory or an input buffer) to be used later for regenerating the data block. In some situations, the result of the check may even cause compression operation to be aborted.

In one embodiment, instead of issuing separate jobs for compressing the data block and checking for constant(s), which incurs additional latency, the constant detection of the data block is performed automatically and concurrently with the compression of the data block. That is, responsive to a request to compress a data block, a hardware accelerator conducts both the constant check operations and compression operations on the data block, and outputs a compressed data block as well as the result of the constant check. The outputted compressed data block and result may be stored in the memory hierarchy or other storage locations. The operating system and/or other system software/hardware may subsequently use this result to determine whether to keep or discard the compressed data block.

FIG. 1A illustrates an exemplary processor on which embodiments of the invention may be implemented. CPU 155 may include one or more processor cores. The details of a single processor core ("Core 0") are illustrated in FIG. 1 for simplicity. It will be understood, however, that each core shown in FIG. 1 may have the same or similar set of components as Core 0. For example, each core may include dedicated Level 1 (L1) cache 112 and Level 2 (L2) cache 111 for caching instructions and data according to a specified cache management policy. The L1 cache 112 may additionally include an instruction cache 120 for storing instructions and a data cache 121 for storing data. The instructions and data stored within the various processor caches are managed at the granularity of cache lines which may be a fixed size (e.g., 64, 128, 512 Bytes in length). Data may be stored temporarily in register file 152 during the execution of instructions. Register file 152 may include general purpose registers (GPRs), vector registers, mask registers, etc. Each processor core further includes an instruction fetch unit 110 for fetching instructions from main memory 102 and/or a shared Level 3 (L3) cache 116; a decoder or decode unit 130 for decoding the instructions (e.g., decoding program instructions into micro-operations or "uops"); an execution unit 140 for executing the instructions; and a writeback unit 150 for retiring instructions and writing back results.

The instruction fetch unit 110 may include various well known components including a next instruction pointer 103 for storing the address of the next instruction to be fetched from memory 102 (or one of the caches); an instruction translation look-aside buffer (ITLB) 104 for storing a map of recently used virtual-to-physical instruction addresses to improve the speed of address translation; a branch prediction unit 102 for speculatively predicting instruction branch addresses; and branch target buffers (BTBs) 101 for storing branch addresses and target addresses. Once fetched, instructions are streamed to the remaining stages of the instruction pipeline including the decode unit 130, the execution unit 140, and the writeback unit 150. The structure and function of each of these units is well understood by those of ordinary skill in the art and will not be described here in detail to avoid obscuring the pertinent aspects of the different embodiments of the invention.

The processor core may include an accelerator 160 for performing compression and decompression operations. The accelerator 160 may be implemented in hardware, software, or a combination thereof, and may be communicatively coupled to cores 0-N and the system memory 102 via the interconnect 170. In operation, the accelerator 160 may receive a data block and responsively generate a compressed data block by performing compression operations on the data block in accordance to a compression algorithm such as LZO, Deflate, or any nested compression method. In addition, the accelerator 160 may perform decompression operations on a compressed data block to generate an uncompressed data block.

Figure 1B:
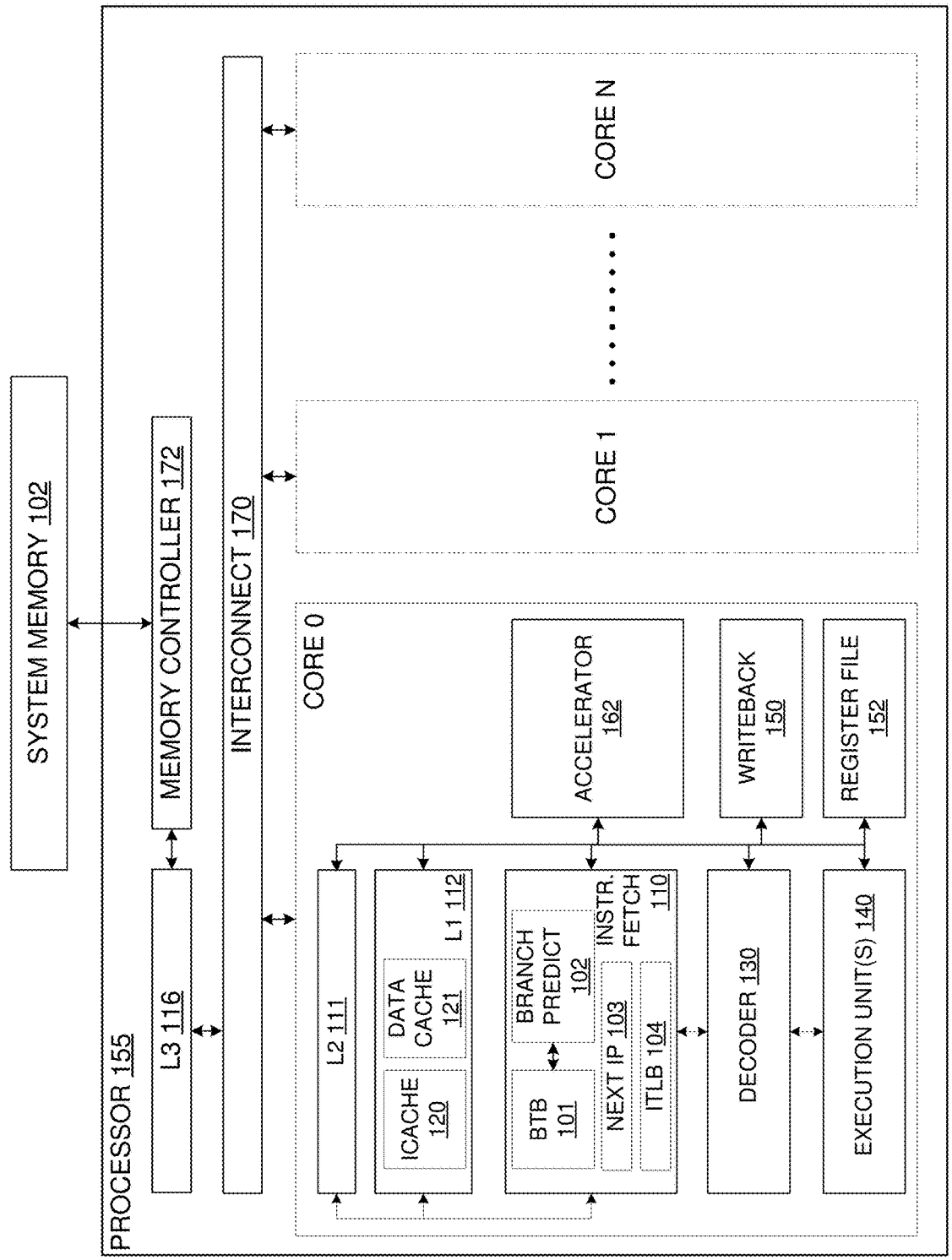
FIG. 1B is a block diagram illustrating another exemplary processor on which embodiments of the present invention may be implemented.

FIG. 1B illustrates another exemplary processor on which embodiments of the present invention may be implemented. In FIG. 1B, one or more cores of processor 155 may each include its own accelerator 162 to perform the compression and/or decompression operations described herein. The accelerator 162 may be implemented instead of, or in addition to, the accelerator 160 of FIG. 1A.

Figure 2A:
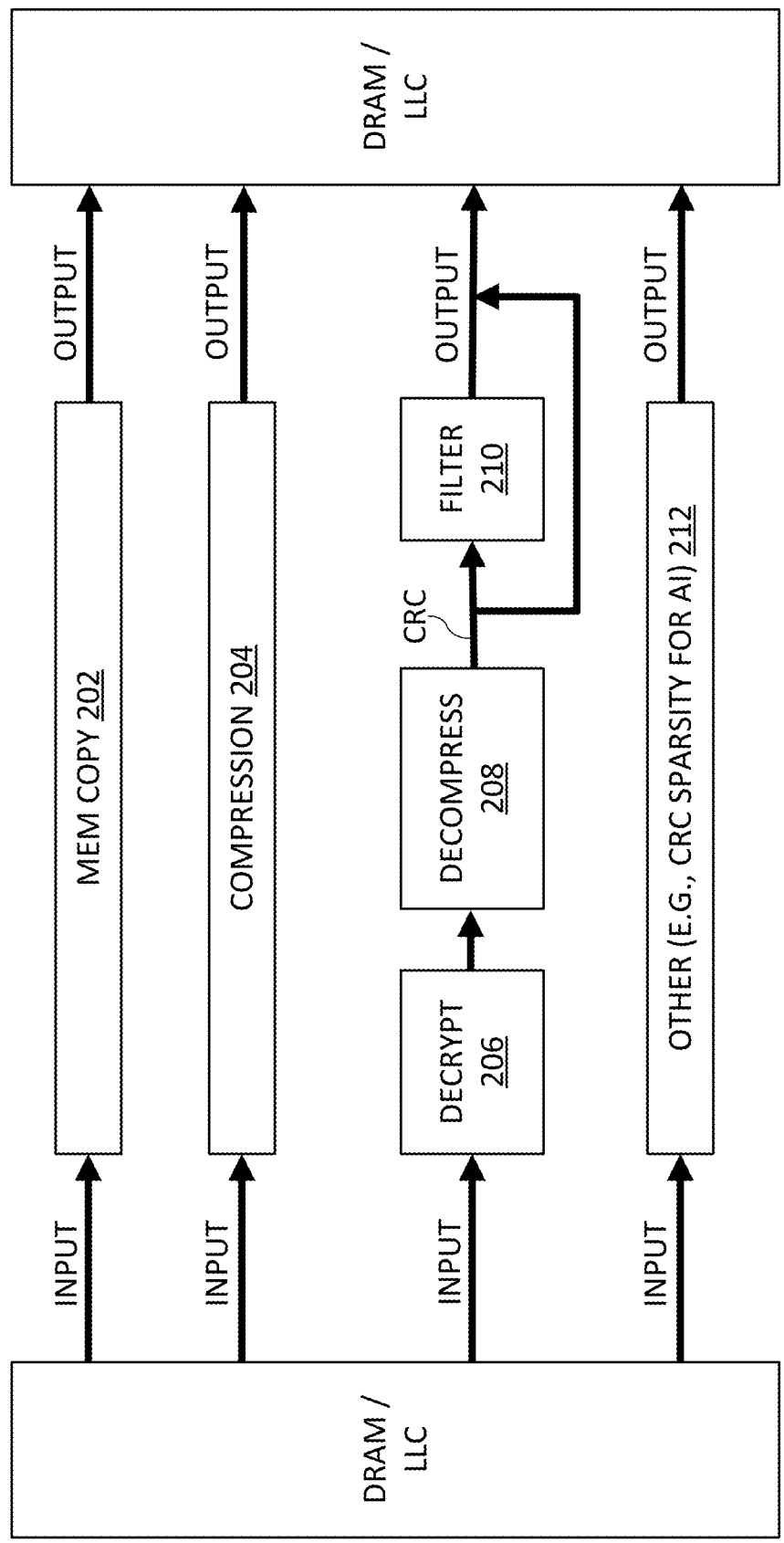
FIG. 2A illustrates various memory operations implemented in a processor.

FIG. 2A illustrates various memory operations implemented in a processor, such as processor 155 from FIGS. 1A and 1B. A memory copy operation 202 is used to copy a memory page from memory to cache or vice versa. It may also be used to copy a memory page from a memory or cache to another location within the same memory or cache. A compress operation 204 takes a memory page from memory or cache, compresses it, and stores the resulting compressed page to a location within the memory or cache. An associated decompression operation 208 takes a compressed page from memory or cache, decompresses it and stores the decompressed result to a location within the memory or cache. Additional operations such as decryption 206 and filtering 210 may also be performed with the decompression operation 208. The memory operations may also include various other specialized operations 212 that are performed on pages from the memory or cache.

Figure 2B:
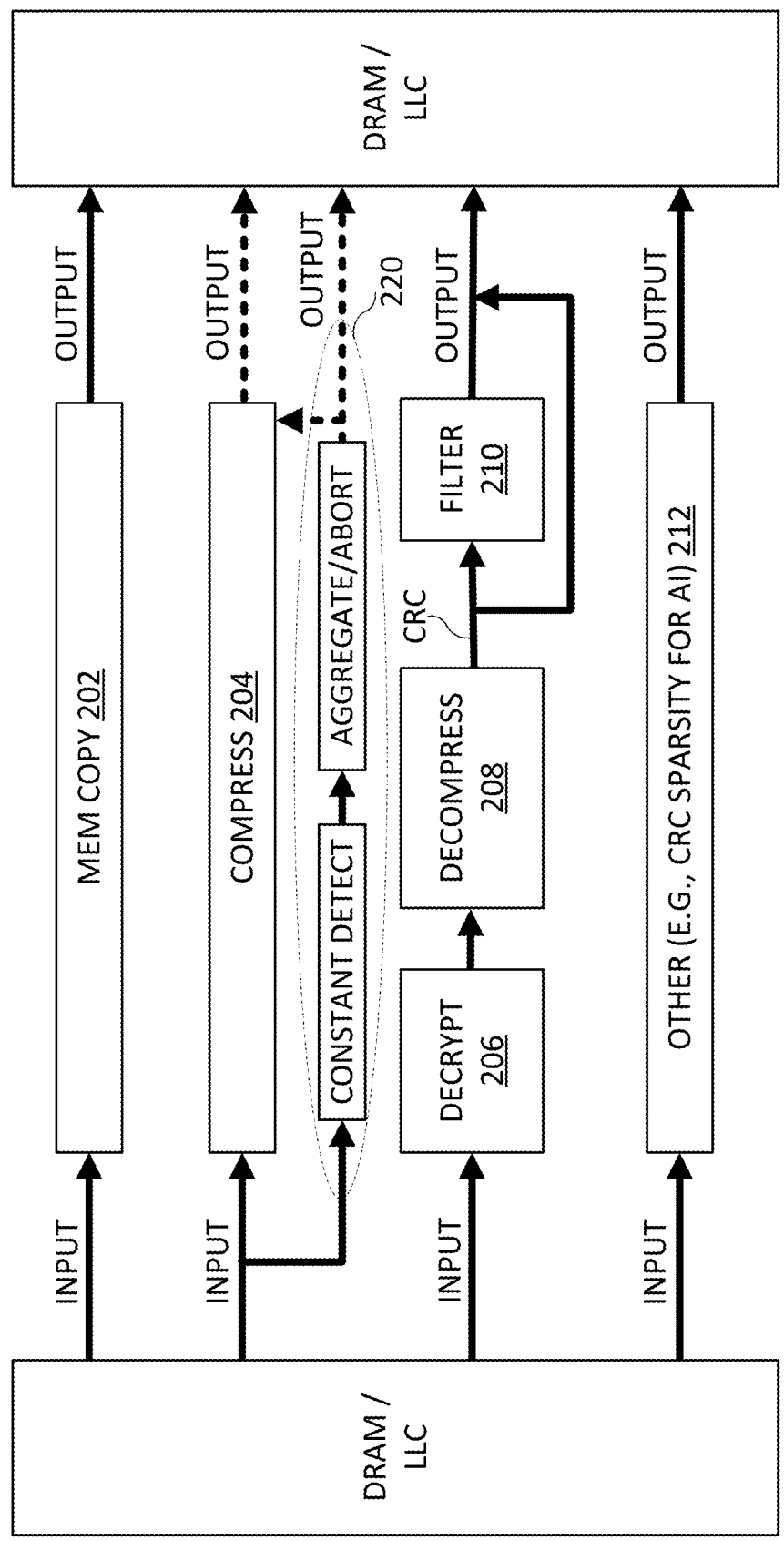
FIG. 2B illustrates an embodiment of a constant detection operation in relation to other memory operations.

FIG. 2B illustrates an embodiment of the constant detection operation/functionality in relation to the other memory operations. Specifically, the constant detection operation 220 is performed separately and alongside the compression operation 204. It may be performed on memory pages from either the memory or cache. The output from the constant detection operation 220 may be stored to the memory or cache, and/or provided to supplement the compression operation 204, as detailed further below.

Figure 3A:
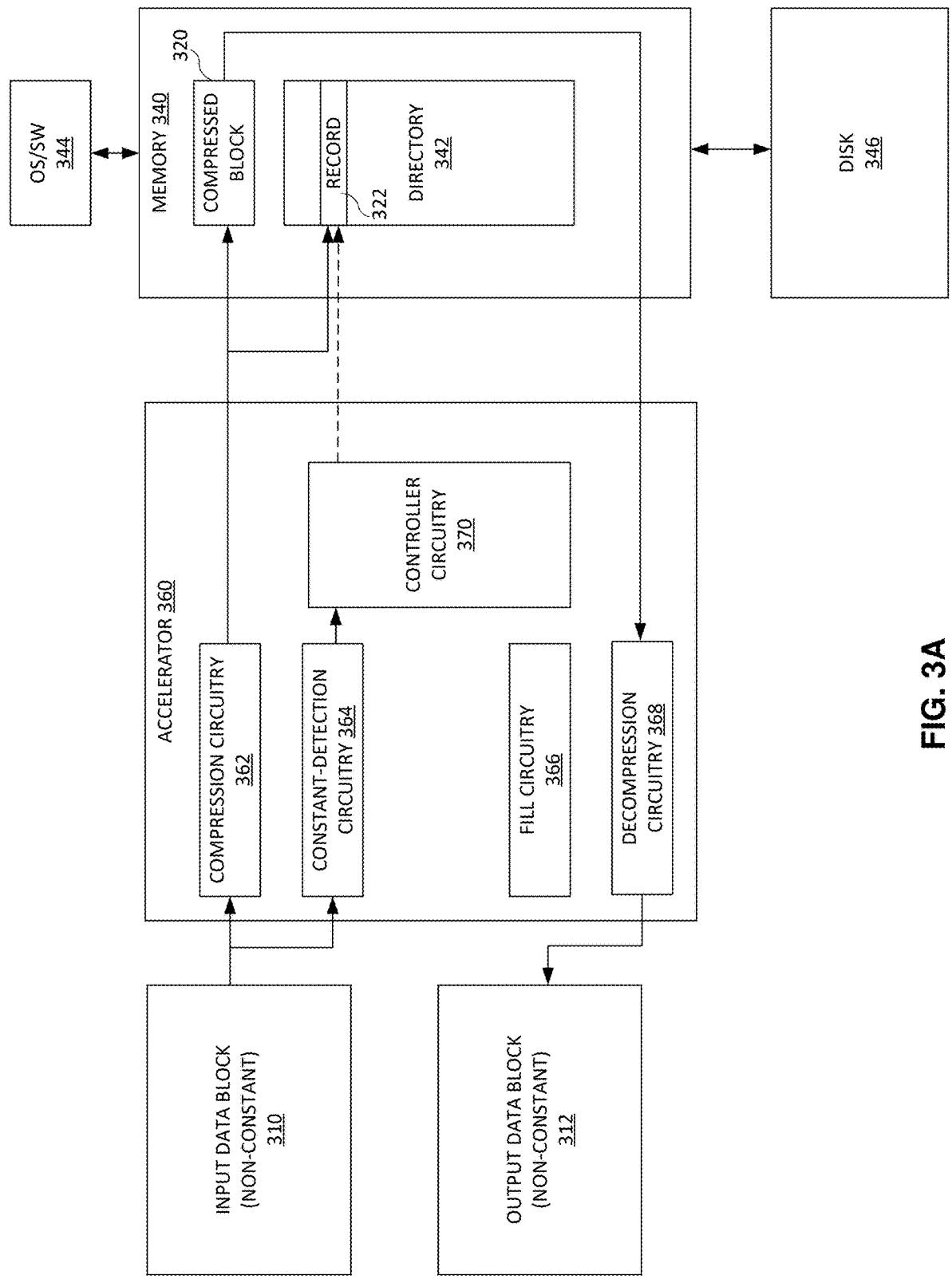
FIG. 3A illustrates the operations associated with compression and decompression of a non-constant data block according to an embodiment.
Figure 3B:
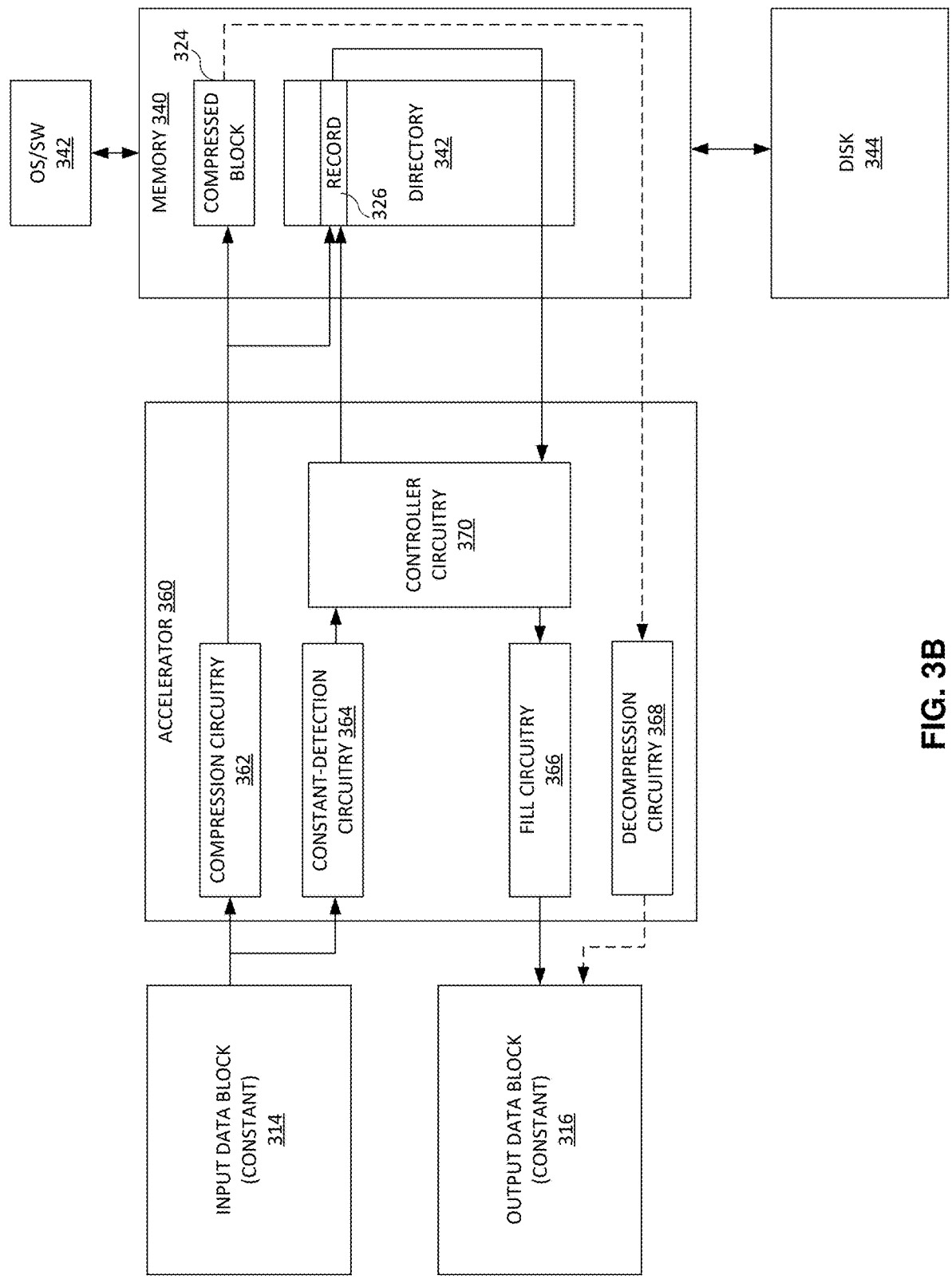
FIG. 3B illustrates the operations associated with compression and decompression of a constant data block according to an embodiment.
Figure 3C:
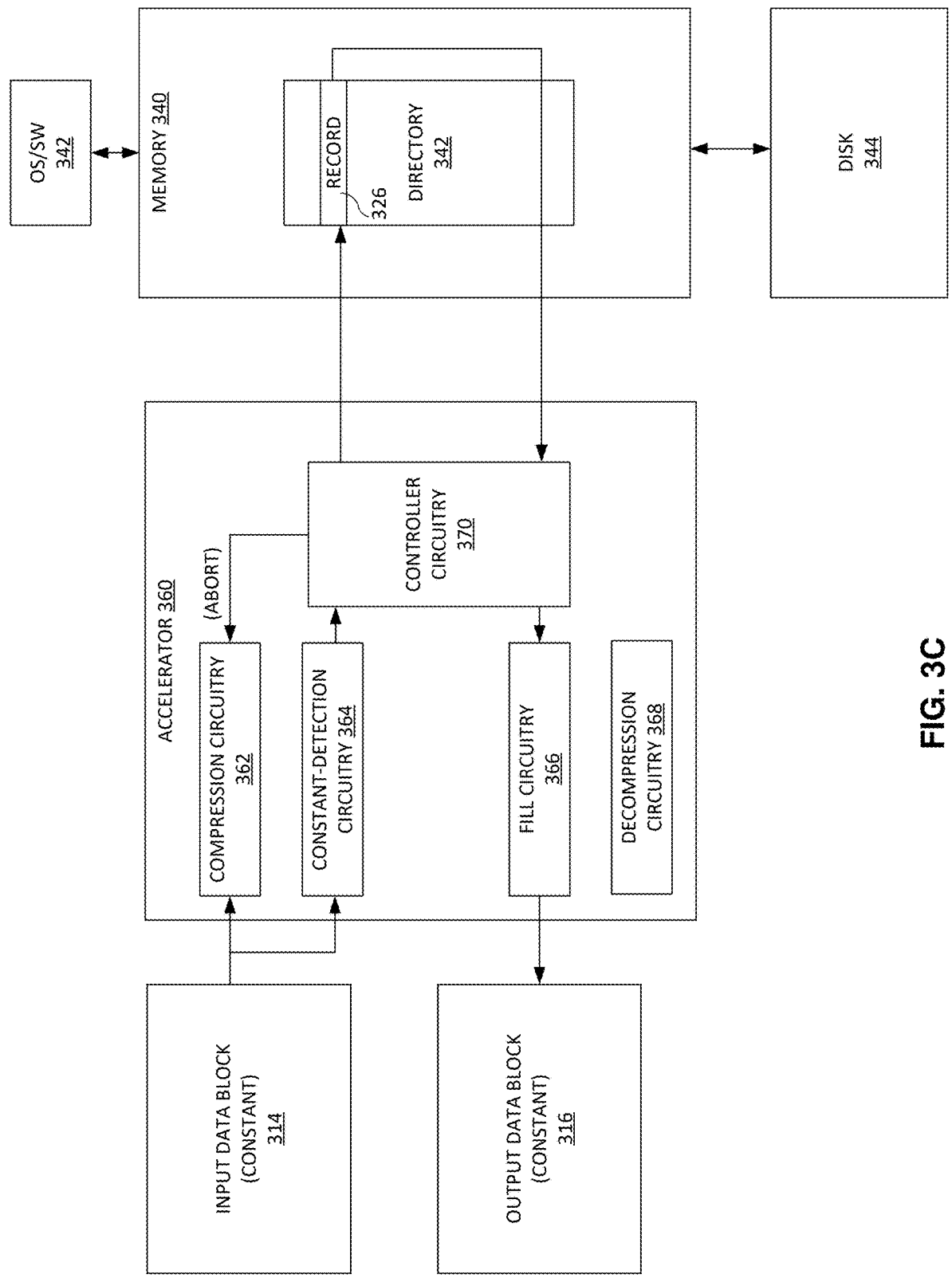
FIG. 3C illustrates the operations associated with compression and decompression of a non-constant data block according to another embodiment.

FIGS. 3A-3C illustrate various operations of an accelerator according to embodiments of the present invention. One skilled in the art will recognize that some elements are intentionally omitted so as not to obscure the key aspects. Other elements, while illustrated, may be optional and thus can be omitted to accommodate the desired implementation. Reference numbers that are shared across multiple figures are used to denote the same element or similar elements. In FIG. 3A, operations associated with the compression and/or decompression of a non-constant data block are illustrated. In contrast, FIGS. 3B and 3C illustrate the compression and/or decompression operations of a constant data block.

Referring now to FIG. 3A, an accelerator 360 may include compression circuitry 362, constant-detection circuitry 364, fill circuitry 366, decompression circuitry 368, and controller circuitry 370. According to an embodiment, some of the circuitries (e.g., compression circuitry or decompression circuitry) and the operations associated therewith may be implemented by separate accelerators. An input data block 310, such as a memory page, is received by the accelerator 360 to be compressed. The input data block 310 may be identified by a job descriptor or job request to be processed by the accelerator 360. The job descriptor may be issued by, for example, one of the processor cores 0-N illustrated in FIGS. 1A-B, or from the memory controller 172. As noted above, the input data block 310 is a non-constant data block which means it is not comprised of a repeating constant. The input data block 310 received by the accelerator is processed by the compression circuitry 362 to generate a compressed data block 320. In one embodiment, the input data block 310 is compressed according to a particular compression algorithm (e.g., LZO or Deflate) specified by the job descriptor. Alternatively, no compression algorithm is specified and the input data block 310 is compressed via the default compression algorithm implemented by the accelerator.

Next, the compressed block 320 is stored in a location in the memory hierarchy 340 such as the system memory 102 or one of the caches 116 or 111 of FIGS. 1A-1B. As part of completing the compression operations on the input data block 310, according to an embodiment, a completion record 322 is generated. The completion record may include various information such as the memory address associated with data block 310 and/or the storage location of compressed block 320. According to an embodiment, the completion record 322 may also include a constant block field or aggregate field to indicate whether the data block associated with the completion record is a constant data block. The field may be initialized or set to a default value indicating that the associated data block is not a constant data block. The completion record 322, or information contained therein, may be stored in directory 342 of memory hierarchy 340. In some embodiments, completion record 322 may be stored instead in a data structure outside of the memory hierarchy (not shown). FIG. 10 illustrates the details of a job descriptor 1010 and a completion record 1020 according to an embodiment. The constant block field or aggregate field may be implemented in one of the unused portions of the completion record 1020 and/or an existing field.

Concurrently with the performance of the compression operations by the compression circuitry 362, according to an embodiment, the input data block 310 is received and checked by the constant-detection circuitry 364 to determine whether it is a constant data block. The result of that check is provided to the controller circuitry 370. In one embodiment, when the result indicates that the input data block 310 is not a constant data block, no further action is taken. Alternatively, the controller circuitry 370 may update record 322 to indicate that the compressed data block 320 is a not a constant data block. In some embodiments, the controller circuitry 370 updates the completion record generated by the compression circuitry 362 prior to it being stored to the directory 342.

Thereafter, a request for data (i.e. data block 310) is issued by the OS or an application. The requested may specify the requested data via a memory address, which is used to perform a lookup in directory 342 to find a matching record or entry. If the memory address in the request matches the memory address in the record associated with data block 310, the constant block field is checked to see if the requested data is a constant data block. When the field indicates that data block 310 is not a constant data block, the compressed data block 320 is retrieved (i.e. read from memory) and sent to the accelerator 360. Accordingly, the decompression circuitry 368 performs decompression operation on the compressed data block 320 to generate output data block 312 which is used to fill the request.

FIG. 3B illustrate the operations of compressing and decompressing a constant data block by an accelerator in accordance with an embodiment. As illustrated, input data block 314 is received by the accelerator 360 to be compressed. Input data block 314, in this case, is a constant data block. That is, it is comprised of a repeating bit sequence (e.g., a constant byte, word, or doubleword, etc.). Similar to the description above with respect to FIG. 3A, the input data block 314 may be identified by a job descriptor or job request sent to the accelerator 360 by one of the processor cores 0-N or by the memory controller 172. The input data block 314 is received and compressed by the compression circuitry 362 in accordance with a compression algorithm (e.g., LZO or deflate) to generate a compressed data block 324. The compressed data block 324 is then stored to the memory hierarchy 340 and a completion record 326 associated with the compressed block 324 is generated. The completion record 326, or information contained therein, is stored to the directory 342 or another data structure. Information stored in the completion record may include the memory address associated with the input data block 314, the location of the compressed data block 324, and/or an indication of whether the input data block 314 is a constant data block. In some embodiments, the constant value associated with the constant data block is also stored in the completion record 326.

Concurrently with the performance of the compression operations by the compression circuitry 362, according to an embodiment, the input data block 314 is received and checked by the constant-detection circuitry 364 to determine whether it is a constant data block. The result of the check is provided to the controller circuitry 370. In the case of data block 314, the result indicates that it is a constant data block and, in response, the controller circuitry 370 updates completion record 326 accordingly. For example, the constant data field of record 326 may be updated to a value indicating that the data block 314 is a constant data block. Alternatively, or in addition to, an indication that the data block 314 is a constant data block is attached to, or otherwise associated with, the input data block 314 itself.

Irrespective of how the indication is attached or associated with the input data block 314, the indication is usable by the OS or system hardware/software to decide how to handle the compressed block 324. For example, the OS may cause the compressed data block 324 to be discarded or evicted from the memory hierarchy 340, or otherwise overwritten by other data. In some cases, the OS may simply ignore the indication and handle the compressed data block 324 as normal, as if it was generated from a non-constant data block.

After the compression and constant-detect operations are performed on data block 314, a request for data for data block 314 may subsequently be issued by the OS or an application. Responsive to the request, a lookup is performed in directory 342 to find record 326 associated with data block 314. The constant block field of record 326 is checked to see if data block 314 is a constant data block. Since data block 314 is a constant data block, a request is sent to the accelerator 360 to generate the requested data block from a constant. For example, the constant that is stored in record 326 may be provided to the fill circuitry 366 of accelerator 360 which uses it to generate the output data block 316. For example, if the constant value is a byte value, the fill circuitry may generate a data block (e.g. a 4 KB memory page) by filling it with multiple (e.g., 4K) instances of the byte value. Alternatively, the OS/software may decide to ignore the indication that data block 314 is a constant data block. In such case, the compressed block 324 is provided to the decompression circuitry 368 of the accelerator 360 and decompressed with the appropriate decompression algorithm/method to generate output data block 316, as indicated by the dashed arrows.

FIG. 3C is a block diagram illustrating the operations associated with compressing/decompressing a constant data block according to another embodiment. As with FIG. 3B, an input constant data block 314 is received by the accelerator 360 to be compressed in accordance with a compression algorithm. Concurrently with the compression operations, the input data block 314 is checked by the constant-detection circuitry 364 to see if it is a constant data block. The result of the check is provided to the controller circuitry 370.

Next, because the result indicates that the input data block 314 is a constant data block, the controller circuitry 370 then queries the compression circuitry to determine whether the compression of input data block 314 has completed. Depending on the compression algorithm used, the compression operations may include multiple stages. For example, in the case of Deflate compression, there is at least a first stage, in which Huffman code/tree is generated, and a second stage, in which the data block is compressed based on the generated Huffman code/tree. If the input data block 314 is found to be a constant data block before all of the compression operations (stages) have finished, the controller circuitry may instruct the compression circuitry 362 to abort any remaining compression operations (stages). In one embodiment, the compression circuitry 362 may receive the result of the constant detection directly from the controller circuitry 370 or the constant detection circuitry 364. Based on the result, the compression circuitry 362 may automatically abort any compression operations still outstanding. In some embodiments, the compression circuitry 362 may pause after completing a certain number of operations or after specific stages to wait for the result of the constant detection. For example, In the case of Deflate compression, the compression circuitry 370 may pause after completing the first stage to wait for the result from the constant detection before deciding whether to continue or abort the second stage.

According to some embodiments, in addition to instructing the compression circuitry 362 to abort compression, the controller circuitry 370 may update record 326 in directory 342 to associate the data block 314 with an indication of constant block. As noted above, a field in record 326 may be updated to indicate that data block 314 is a constant data block.

Thereafter, when data block 314 is requested, the OS and/or software perform a lookup in the directory 342 and determine from record 326 that the requested data block is a constant data block. According to an embodiment, the OS and/or software then request the accelerator 360 to generate the requested data block from the constant value associated with data block 314. The constant value may be provided in the request to the accelerator 360 or may be looked up from another source (e.g., an input buffer or directory 342). Accordingly, the fill circuitry 366 of accelerator 360 generates the output data block 316 using the constant value. For example, the fill circuitry 366 may fill a data block (e.g., a 4 KB page) with multiple (e.g., 4K) instances of the constant value. It is worth noting that since the compression of data block 314 was aborted, there is no compressed data block stored in the memory hierarchy 340. As such, unlike the operations illustrated in FIG. 3B, the output data block 316 in FIG. 3C can only be generated from the constant value.

According to an embodiment, a field such as an aggregate field in the completion record is used to indicate whether a data block is a constant data block. In one embodiment, the aggregate field is initially written as "0". When the constant detect functionality is enabled, the aggregate "sum" will be written as "1" if all of the bytes in the input data block are the same. Otherwise, the aggregate "sum" is written as "0" if any of the input bytes are different. The data being compared is the input to the Deflate compression or zero-compression zcomp if nested compression is enabled. In one embodiment, if the input block is of zero size, it is considered "all the same" and thus the aggregate "sum" will be written as "1". Note that while the completion record may show that all of the bytes in the input data block are the same byte, the actual value of the byte may not necessarily be stored in the completion record but is looked up from another source, such as an input buffer. In one embodiment, the constant detection functionality is always enabled.

In some embodiments, the compression operations and/or the constant detection operations performed on a data block are be divided into multiple dependent jobs, where each job operates on a respective portion of the data block. To enable the constant detection across multiple jobs, a data structure (state structure) may be used to pass the state of the constant detection between different jobs. For example, the state of the constant detection may need to be passed from the end of job N to the start of the next job N+1. In order to do so, a data structure accessible by the different jobs may be used to store the state of the constant detection. FIG. 4 illustrate the exemplary fields for preserving the partial state of the constant detection operations between multiple jobs in accordance with an embodiment. The data structure may include a reference value field 402, a reference value valid field (valid field) 404, and/or a differing value already seen field (seen field) 406. The reference value field 402, as the name suggests, stores the reference value (i.e. the constant) against which all other values in the data block are compared. The size of the field is dependent on the size of the reference value. If the constant detection is implemented to check for a constant byte, then the reference value field simply stores the first byte of the input data block or stream. As for the valid field 404, it stores an indication of whether the value (e.g., a constant byte) stored in the reference value field 402 is valid. For example, at the start of the check, the valid field 404 is not set. Then, as the first value (byte) of the data block is stored into the reference value field 402, the valid field 404 is set to indicate the constant detection operations may begin to use the reference value to compare against subsequent values. The seen field 406 stores an indication of whether a value other than the reference value has been detected in the data block or any portion thereof. A set value indicates that the input data block is not a constant data block.

Table 420 illustrate the possible interpretations of various combinations of the valid field 404 and seen field 406. If the valid field and the seen field are both unset (e.g., "0"), it means the reference byte value should be ignored and that no value has been previously seen. This scenario may occur during initialization before any constant detection operations are performed. When the valid field 404 is set (e.g., "1") while the seen field is not set (e.g., "0"), it signals that the reference value is valid and that all the values checked so far are all equal to the reference value. In other words, the constant detection is in progress and all portions of the data block up to now contain instances of the reference value. In one embodiment, when a value other than the reference value is detected, the seen field 406 is changed to a set bit ("1") and the bit in the valid field 404 is cleared ("0"). In addition, the reference value field 402 may be cleared out. Thus, a set seen field 406 signifies that at least one value other than the reference value has been detected in the data block. Accordingly, when a subsequent job sees a set seen field 406, the job may simply abort to save on resources. While the reference value is often referred to herein as a byte, it may also include other sizes based on the desired implementation. For example, the reference value field 402 may be extended to contain a reference word (16 bits) or doubleword (32 bits), etc. In such implementations, the constant detection performed on a 4 KB data block may check for 2K instances of a reference word or for 1K instances of a reference doubleword. Thus, different embodiments of the constant detection function may be implemented to check for constants of different sizes. According to an embodiment, if the size of the data block is not an integral multiple of the size of the reference value, an error may be generated, and the constant detection operations aborted.

Figure 5:
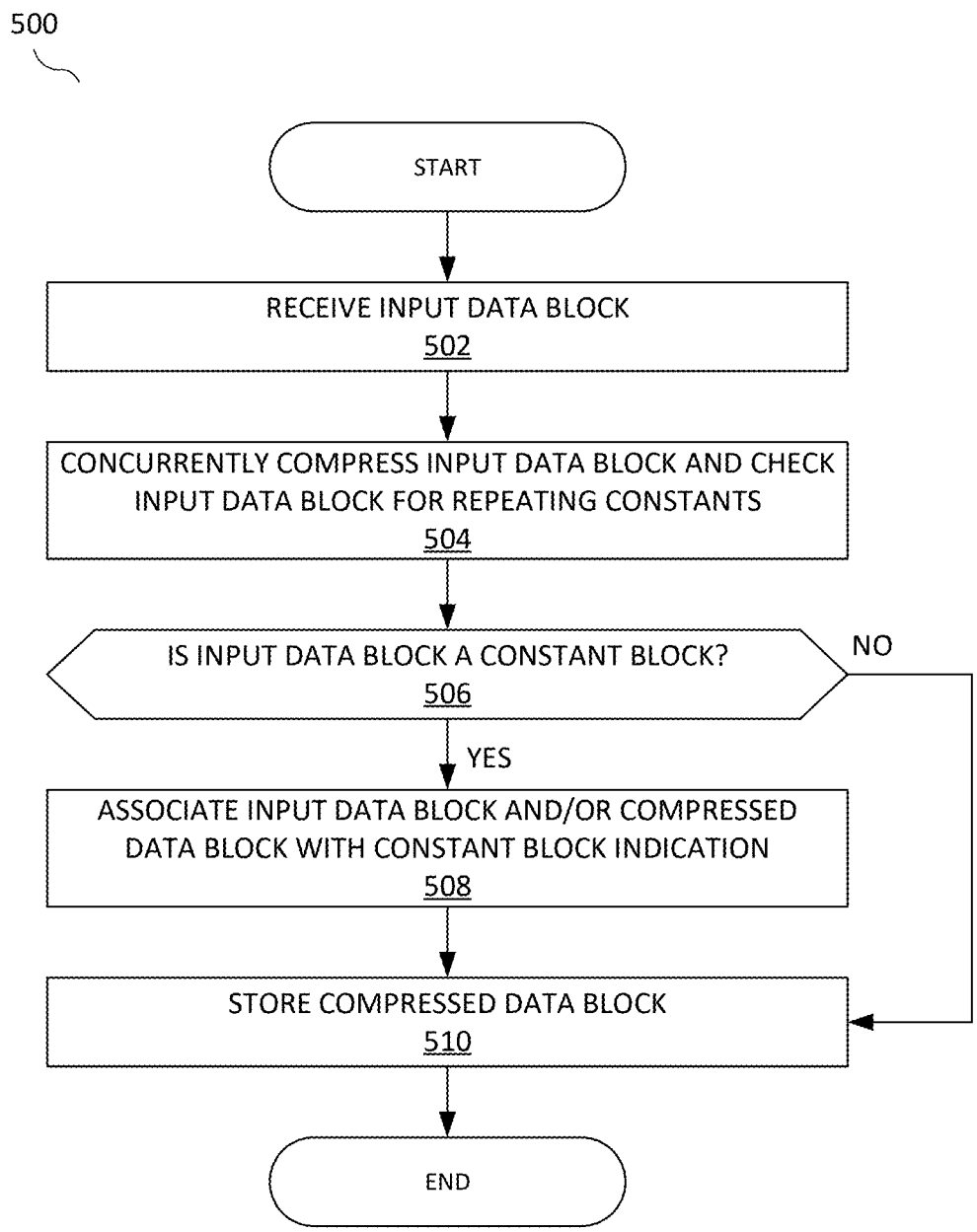
FIG. 5 is a flow diagram illustrating the operations associated with the compression and the constant detection of a data block according to an embodiment.

FIG. 5 is a flow diagram illustrating operations associated with compression and constant detection of a data block according to an embodiment. Method 500 may be implemented in any of the systems described herein. For example, method 500 may be implemented in an accelerator such as accelerator 360 from FIGS. 3A-3C. Method 500 begins at the Start block. At 502 an input data block is received. The input data block may be either a constant data block or a non-constant data block. At 504, the input data block is compressed to generate a compressed data block and checked for repeating constants. The compression of the data block and the check for repeating constants is, according to an embodiment, performed concurrently and in parallel. For example, the input data block may be compressed via the compression circuitry while at the same time a copy of the input data block is checked by the constant detection circuitry for repeating constants. At 506, a determination is made on whether the input data block is a constant data block. That is, whether the input data block is comprised solely of repeat instances of a constant value (i.e. a repeating bit string). If the input data block is not a constant data block, then, at 510, the compressed data block is stored to the memory hierarchy such as the system memory or the cache. However, if the input data block is found to be a constant data block at 506, then at 508, the input data block and/or the compressed data block is associated with a constant block indication. As detailed above, in one embodiment, an indication may be stored in the completion record that was generated from the compression of the input data block. Next, at 510, the compressed data block is stored to the memory hierarchy.

Figure 6:
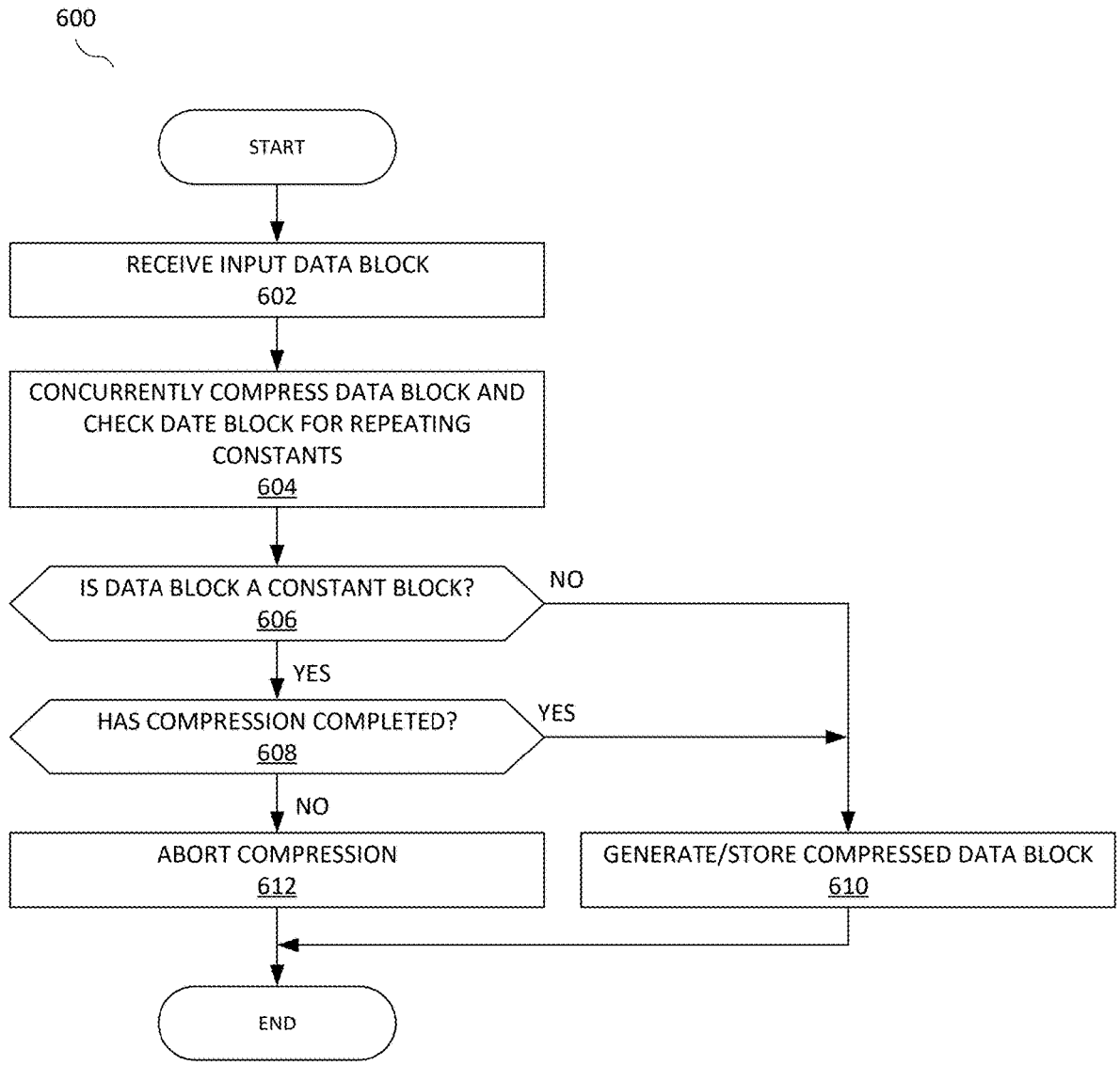
FIG. 6 is another flow diagram illustrating operations associated the compression and constant detection of a data block according to an embodiment.

FIG. 6 is a flow diagram illustrating operations associated the compression and constant detection of a data block according to an embodiment. Method 600 may be implemented in any of the systems described herein. Specifically, method 600 may be implemented in any accelerator capable of performing compression operations, such as accelerator 360 from FIGS. 3A-3C. Method 600 begins at the "START" block. At 602 an input data block is received. The input data block may be either a constant data block or a non-constant data block. At 604, one or more compression operations are performed on the input data block. At the same time, one or more constant detection operations are also performed on the input data block to checked for repeating constants. According to an embodiment, the compression operations are performed concurrently with, but separately from, the constant detection operations. For example, an accelerator may include separate compression logic/circuitry and constant detection logic/circuitry to perform these operations. At 606, a determination is made on whether the input data block is a constant data block. As noted above, an input data block is a constant data block if it is comprised solely of repeat instances of a constant value (i.e. a repeating bit string). If the input data block is not a constant data block, then at 610, a compressed data block generated from compression operations is stored to the memory hierarchy, such as the system memory or the cache. If, however, the input data block is determined to be a constant data block at 606, then at 608, a determination is made on whether the compression operations performed on the input data block has been completed. If compression operations are already completed, then the compressed data block is stored at 610. On the other hand, if the compression operations have not yet been completed, then the compression operation is aborted. For example, some compression algorithms, such as Deflate, perform compression in multiple stages. If the input data block is determined to be a constant data block before all of the compression stages have completed, then any remaining stages yet to be performed are aborted at 612.

Figure 7:
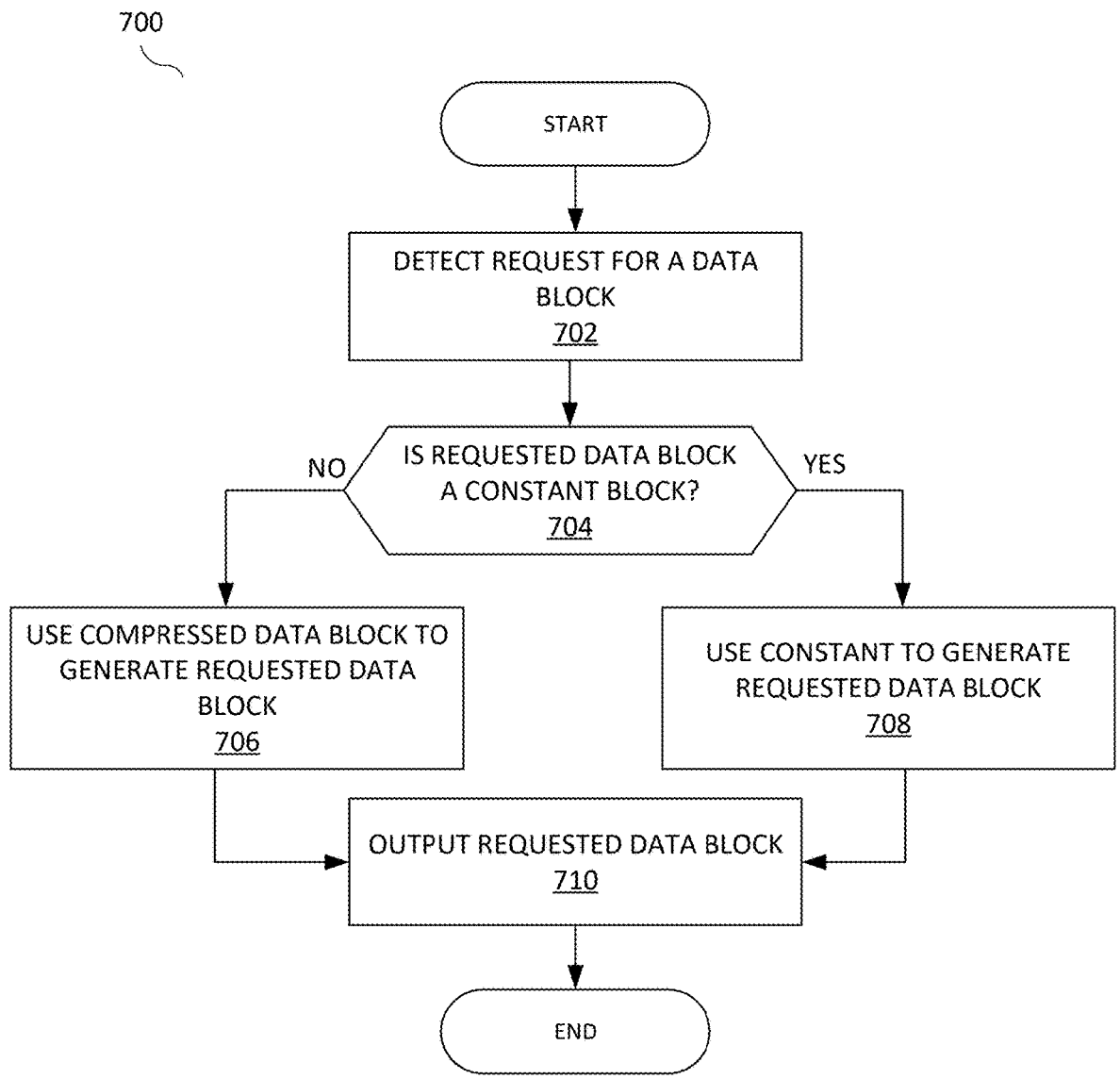
FIG. 7 is flow diagram illustrating operations associated decompressing a data block in accordance with an embodiment.

Turning now to FIG. 7, which illustrates a flow diagram of the operations associated with decompressing a data block according to an embodiment. Method 700 may be implemented in any of the systems described herein. Specifically, method 700 may be implemented in any accelerator capable of performing decompression and/or fill operations, such as accelerator 360 from FIGS. 3A-3C. Method 700 begins at the "START" block. At 702, a request for a data block is detected. At 704, a determination is made on whether the requested data block is a constant data block. In one embodiment, this is determined by looking up the status of the requested data block. For example, the memory address of the requested data block may be used to look up a directory (e.g., director 360) to obtain a record (e.g., 320 or 324) associated with the requested data block. The record, according to an embodiment, contains a field indicating whether the associated data block is a constant data block. At 706, if the requested data block is not a constant data block, a compressed version of the requested data block is retrieved and decompressed to generate the requested data block. However, if the requested data block is indeed a constant data block, such that it is made up of multiple instances of a constant value, then at GGQ08, that constant value is used to generate the requested data block. In one embodiment, the constant value is provided by the record obtained from the directory during the lookup. A fill circuitry may fill a buffer with repeat instances of the constant value to generate the requested data block. Irrespective of how the requested data block is generated, it is outputted to fulfill the data request at 710.

Figure 8:
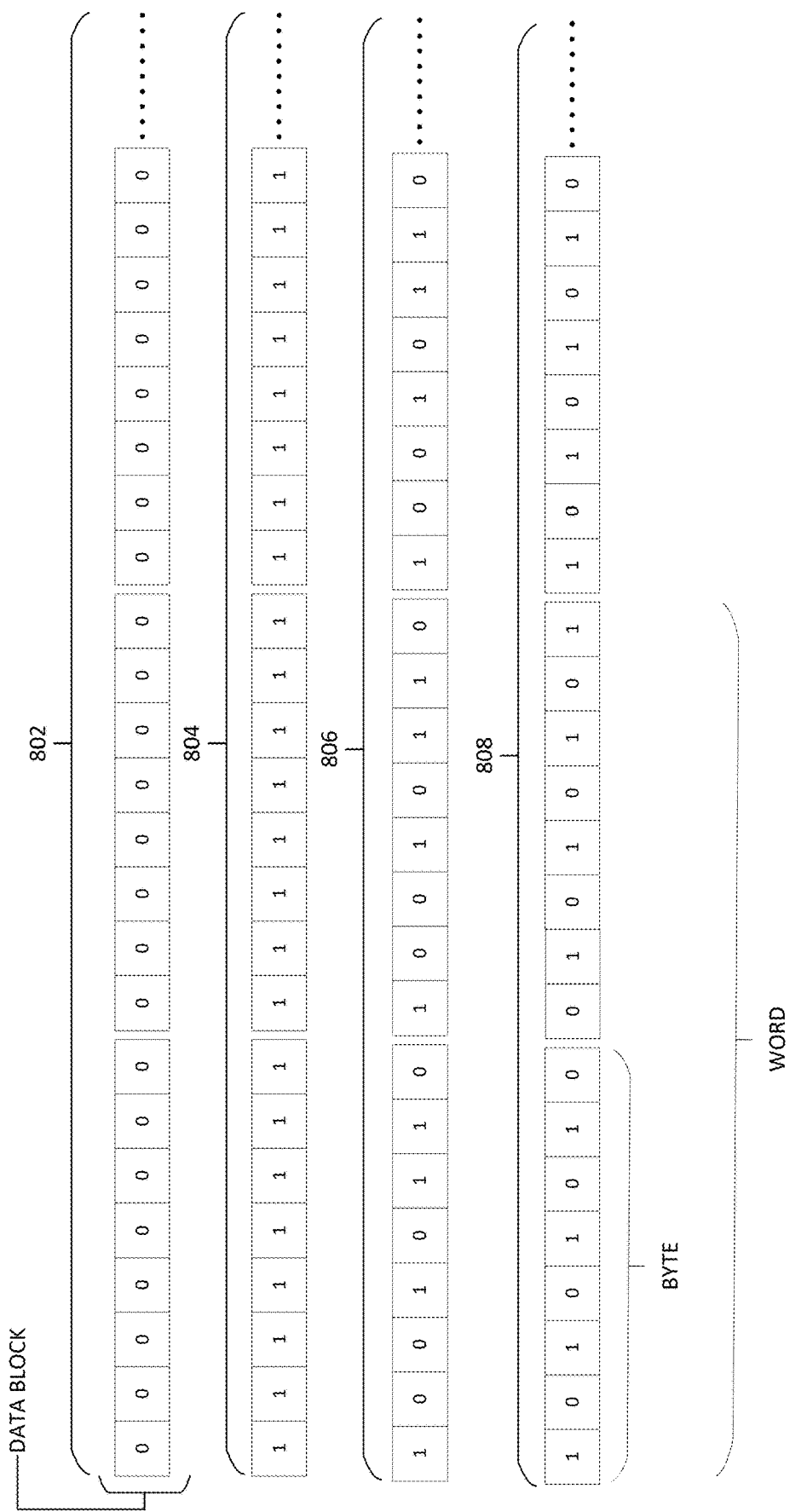
FIG. 8 illustrate examples of constant and non-constant data blocks according to embodiments of the present invention.

FIG. 8 illustrate examples of constant and non-constant data blocks according to an embodiment. Each of the rows shown in FIG. 8 represents a data block. As noted above, each data block may be a memory page. While a typical size of a memory page is 4 KB, other size (e.g., 8 KB, 16 Kb, etc.) may also be used depending on the desired implementation. As defined herein, a constant data block is comprised of a repeating bit sequence of a specific size whereas a non-constant data block is not. To illustrate, data block 802 is an example of a constant data block because it is made up of repeat instances of the constant byte 0x00 (bit sequence "00000000"). Similarly, data blocks 804 and 806 contain repeating instances of the constant byte 0x11 (bit sequence "11111111") and 0x96 (bit sequence "1001010"), respectively. As such, they are also constant data blocks. In contrast, data block 808 comprises 0xAA (bit sequence "10101010") in the first byte, 0x55 (Bit sequence 01010101) in the second byte, 0xAA ("10101010") again in the third byte, 0x55 ("01010101") again in the fourth byte, and so on. Since data block 808 contains more than one byte value (0xAA and 0x55), it is not a constant data block even though some of the byte values are repeating. It is worth noting that data block 808 may be considered a constant word block, since the first word value 0xAA55 is repeated throughout the data block 808.

Figure 9:
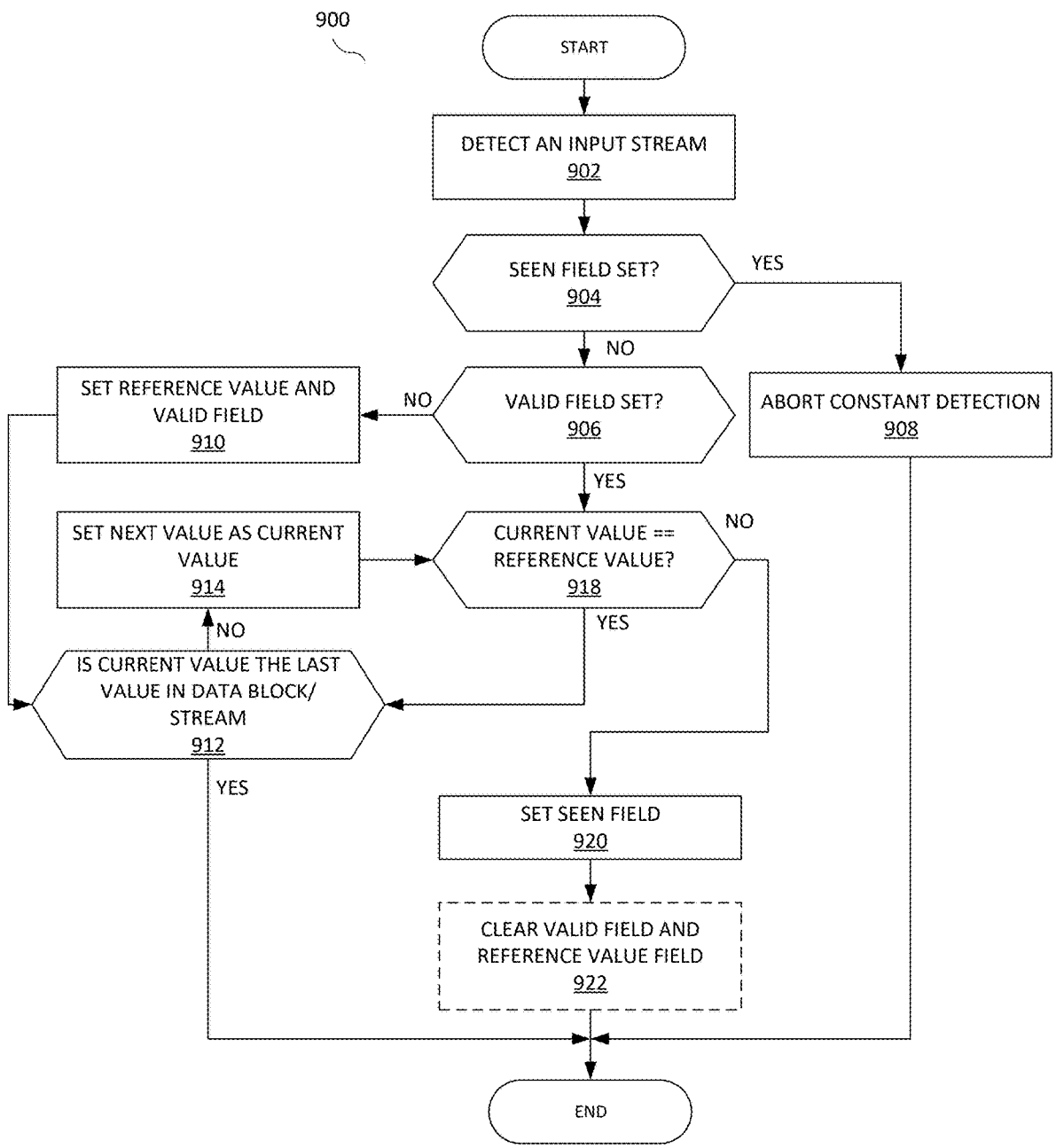
FIG. 9 is a flow diagram illustrating an embodiment of the constant-detection operation.

FIG. 9 is a flow diagram illustrating an embodiment of the constant-detection operation. Method 900 may be performed by constant detection circuitry 364 of FIGS. 3A-3C. At 902, an input stream on which constant-detection is to be performed is detected. As described above, the constant detection on a data block may be divided into multiple jobs. Thus, the input stream referred to here may be the entire data block or only a portion of it (e.g., 1 KB portion of a 4 KB block). To implement constant detection across multiple jobs, fields in a state structure are used to preserve the various states/progress of the detection. The details of these fields are described above with respect to FIG. 4. At 904, a determination is made on whether the seen field in the state structure has been set. If so, then at 908, the constant detection is aborted because more than one constant value has already been found in the data block. If the seen field is not set, the valid field is checked next at 906. If the valid field has not been set, then at 910, the valid field is set and a reference value is stored into the reference value field of the state structure. If the constant detection is implemented to check for constant bytes, then the first byte of the input stream is stored into the reference value field. If the constant detection is configured to check for constant words, then the first word of the input stream is stored, and so on. At 912, a check is performed to see if the current value (e.g., the first byte of the input stream) is the only value left to be checked. If so, then the constant detection is complete. On the other hand, if more values remain to be checked, the next value (e.g., the next byte) is set as the current value at 914 and compared with the reference value at 918. Returning to 906, if the valid field is already set, then the operation proceeds straight to 918 without having to set the reference value field. If the current value is the same as the reference value, then at 912 the current value is checked again to see if it is the last value in the input stream to be checked, and if so, the constant detection is complete. However, if, at 918, the current value is found to be different from the reference value, this indicates that the input stream contains more than one constant value and thus fails the constant data block. As such, at 920, the seen field is set so as to notify any subsequent constant check operations that more than one constant value has already been detected. Optionally, at 922, the valid field and/or the reference value field in the state structure are cleared.

EXAMPLES

The following are example implementations of different embodiments of the invention.

Example 1. An apparatus that includes compression circuitry to perform compression operations on a memory block; constant detection circuitry to, concurrently with performance of the compression operations on the memory block, determine that the memory block is a constant data block comprised of only repeat instances of a constant value; and controller circuitry to associate a first indication with the memory block based on the determination. The first indication is usable for controlling whether to abort the compression operations or whether to discard a compressed memory block generated from the compression operations.

Example 2. The apparatus of Example 1, wherein the controller circuitry is to associate the first indication with the memory block by associating the first indication with a memory address of the memory block.

Example 3. The apparatus of Example 1, further including fill circuitry to, responsive to a request for the memory block, generate a copy of the memory block using the constant value when the memory block is associated with the first indication.

Example 4. The apparatus of Example 3, further including decompression circuitry to, responsive to the request for the memory block, generate the copy of the memory block by decompressing the compressed memory block when the memory block is not associated with the first indication.

Example 5. The apparatus of Example 1, wherein the compression operations include at least a first operation to analyze the memory block to generate compression parameters and a second operation to generate the memory block based on the compression parameters.

Example 6. The apparatus of Example 5, wherein the compression circuitry is to abort the second operation responsive to the determination that the memory block is a constant data block.

Example 7. The apparatus of Example 1, further including a storage unit to store the compressed memory block, wherein the storage unit is a system memory or a cache.

Example 8. The apparatus of Example 1, wherein the memory block is a memory page.

Example 9. The apparatus of Example 1, wherein memory block contains M bits, the constant value contains N bits, and the memory block contains M/N occurrences of the constant value.

Example 10. The apparatus of Example 9, wherein N is one of 8, 16, or 32.

Example 11. The apparatus of Example 1, wherein the compression operations is performed based on a DEFLATE or a Lempel-Ziv-Oberhumer (LZO) compression scheme.

Example 12. The apparatus of Example 1, wherein determining that the memory block is a constant data block further includes dividing the memory block into a plurality of smaller memory blocks and determining that each of the plurality of smaller memory block is also comprised of only repeat instances of the constant value.

Example 13. The apparatus of Example 12, wherein the constant value is stored in a state structure and compared with values in each of the plurality of smaller memory blocks.

Example 14. A method that includes: performing compression operations on a memory block; determining that the memory block is a constant data block comprised of only repeat instances of a constant value, wherein the determination is performed concurrently with the compression operations on the memory block; and associating a first indication with the memory block based on the determination, wherein the first indication is usable for controlling whether to abort the compression operations or whether to discard a compressed memory block generated from the compression operations.

Example 15. The method of Example 14, wherein associating the first indication with the memory block further includes associating the first indication with a memory address of the memory block.

Example 16. The method of Example 14, further includes responsive to a request for the memory block, generating a copy of the memory block using the constant value when the memory block is associated with the first indication.

Example 17. The method of Example 16, further includes responsive to the request for the memory block, generating the copy of the memory block by decompressing the compressed memory block when the memory block is not associated with the first indication.

Example 18. The method of Example 14, wherein the compression operations include at least a first operation to analyze the memory block to generate compression parameters and a second operation to generate the memory block based on the compression parameters.

Example 19. The method of Example 18, further includes aborting the second operation responsive to the determination that the memory block is a constant data block.

Example 20. The method of Example 14, further includes storing the compressed memory block in a storage unit, the storage unit comprising a system memory or a cache.

Example 21. The method of Example 14, wherein the memory block is a memory page.

Example 22. The method of Example 14, wherein memory block contains M bits, the constant value contains N bits, and the memory block comprises M/N occurrences of the constant value.

Example 23. The method of Example 22, wherein N is one of 8, 16, or 32.

Example 24. The method of Example 14, wherein the compression operations is performed based on a DEFLATE or a Lempel-Ziv-Oberhumer (LZO) compression scheme.

Example 25. The method of Example 14, wherein determining that the memory block is a constant data block further includes dividing the memory block into a plurality of smaller memory blocks and determining that each of the plurality of smaller memory block is also comprised of only repeat instances of the constant value.

Example 26. The method of Example 25, further includes: storing the constant value in a state structure; and comparing the constant value with values in each of the plurality of smaller memory blocks.

Example 27. A shared cache memory system comprising means to perform a method as disclosed in any of the preceding Examples.

Example 28. An apparatus comprising means to perform a method as disclosed in any of the preceding Examples.

Example 29. Machine-readable storage including machine-readable instruction, when executed, to implement a method or realize an apparatus or system as disclosed in any of the preceding Examples.

Exemplary Processor Architectures and Data Types

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end hardware 1130 coupled to an execution engine hardware 1150, and both are coupled to a memory hardware 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end hardware 1130 includes a branch prediction hardware 1132 coupled to an instruction cache hardware 1134, which is coupled to an instruction translation lookaside buffer (TLB) 1136, which is coupled to an instruction fetch hardware 1138, which is coupled to a decode hardware 1140. The decode hardware 1140 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode hardware 1140 or otherwise within the front end hardware 1130). The decode hardware 1140 is coupled to a rename/allocator hardware 1152 in the execution engine hardware 1150.

The execution engine hardware 1150 includes the rename/allocator hardware 1152 coupled to a retirement hardware 1154 and a set of one or more scheduler hardware 1156. The scheduler hardware 1156 represents any number of different schedulers, including reservations stations, central instruction window, etc. The scheduler hardware 1156 is coupled to the physical register file(s) hardware 1158. Each of the physical register file(s) hardware 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1158 comprises a vector registers hardware, a write mask registers hardware, and a scalar registers hardware. This register hardware may provide architectural vector registers, vector mask registers, and general purpose registers. The physical register file(s) hardware 1158 is overlapped by the retirement hardware 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1154 and the physical register file(s) hardware 1158 are coupled to the execution cluster(s) 1160. The execution cluster(s) 1160 includes a set of one or more execution hardware 1162 and a set of one or more memory access hardware 1164. The execution hardware 1162 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1156, physical register file(s) hardware 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1164). It should also be understood that where separate pipelines are used, one or more of these pipelines may be out-of-order issue/execution and the rest in-order.

The set of memory access hardware 1164 is coupled to the memory hardware 1170, which includes a data TLB hardware 1172 coupled to a data cache hardware 1174 coupled to a level 2 (L2) cache hardware 1176. In one exemplary embodiment, the memory access hardware 1164 may include a load hardware, a store address hardware, and a store data hardware, each of which is coupled to the data TLB hardware 1172 in the memory hardware 1170. The instruction cache hardware 1134 is further coupled to a level 2 (L2) cache hardware 1176 in the memory hardware 1170. The L2 cache hardware 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode hardware 1140 performs the decode stage 1106; 3) the rename/allocator hardware 1152 performs the allocation stage 1108 and renaming stage 1110; 4) the scheduler hardware 1156 performs the schedule stage 1112; 5) the physical register file(s) hardware 1158 and the memory hardware 1170 perform the register read/memory read stage 1114; the execution cluster 1160 perform the execute stage 1116; 6) the memory hardware 1170 and the physical register file(s) hardware 1158 perform the write back/memory write stage 1118; 7) various hardware may be involved in the exception handling stage 1122; and 8) the retirement hardware 1154 and the physical register file(s) hardware 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1134/1174 and a shared L2 cache hardware 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
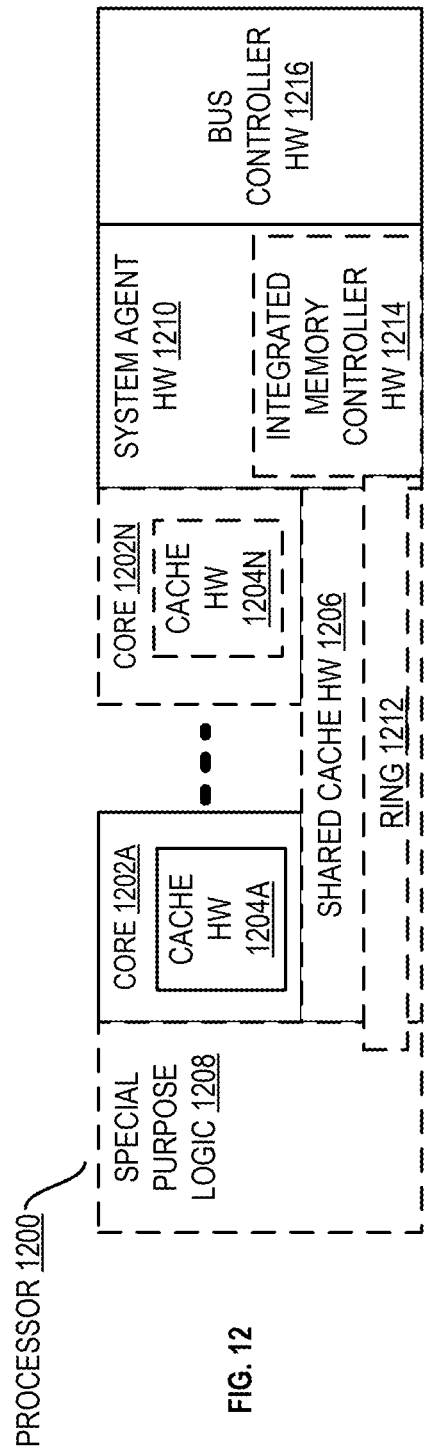
FIG. 12 is a block diagram of a single core processor and a multicore processor with integrated memory controller and graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller hardware 1216, while the optional addition of the dashed lined boxes illustrates an alternative processor 1200 with multiple cores 1202A-N, a set of one or more integrated memory controller hardware 1214 in the system agent hardware 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1206, and external memory (not shown) coupled to the set of integrated memory controller hardware 1214. The set of shared cache hardware 1206 may include one or more mid-level caches, such as level 2 (L2), level 3 (L3), level 4 (L4), or other levels of cache, a last level cache (LLC), and/or combinations thereof. While in one embodiment a ring based interconnect hardware 1212 interconnects the integrated graphics logic 1208, the set of shared cache hardware 1206, and the system agent hardware 1210/integrated memory controller hardware 1214, alternative embodiments may use any number of well-known techniques for interconnecting such hardware. In one embodiment, coherency is maintained between one or more cache hardware 1206 and cores 1202-A-N.

In some embodiments, one or more of the cores 1202A-N are capable of multithreading. The system agent 1210 includes those components coordinating and operating cores 1202A-N. The system agent hardware 1210 may include for example a power control unit (PCU) and a display hardware. The PCU may be or include logic and components needed for regulating the power state of the cores 1202A-N and the integrated graphics logic 1208. The display hardware is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set. In one embodiment, the cores 1202A-N are heterogeneous and include both the "small" cores and "big" cores described below.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
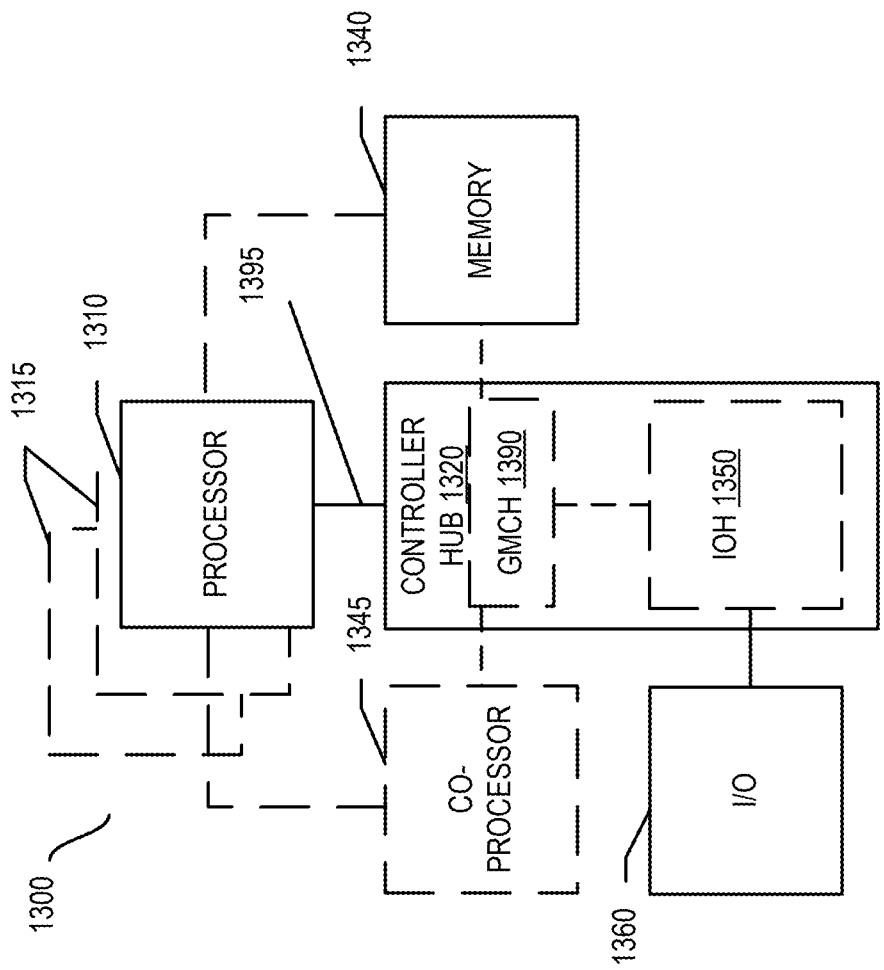
FIG. 13 illustrates a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface, or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
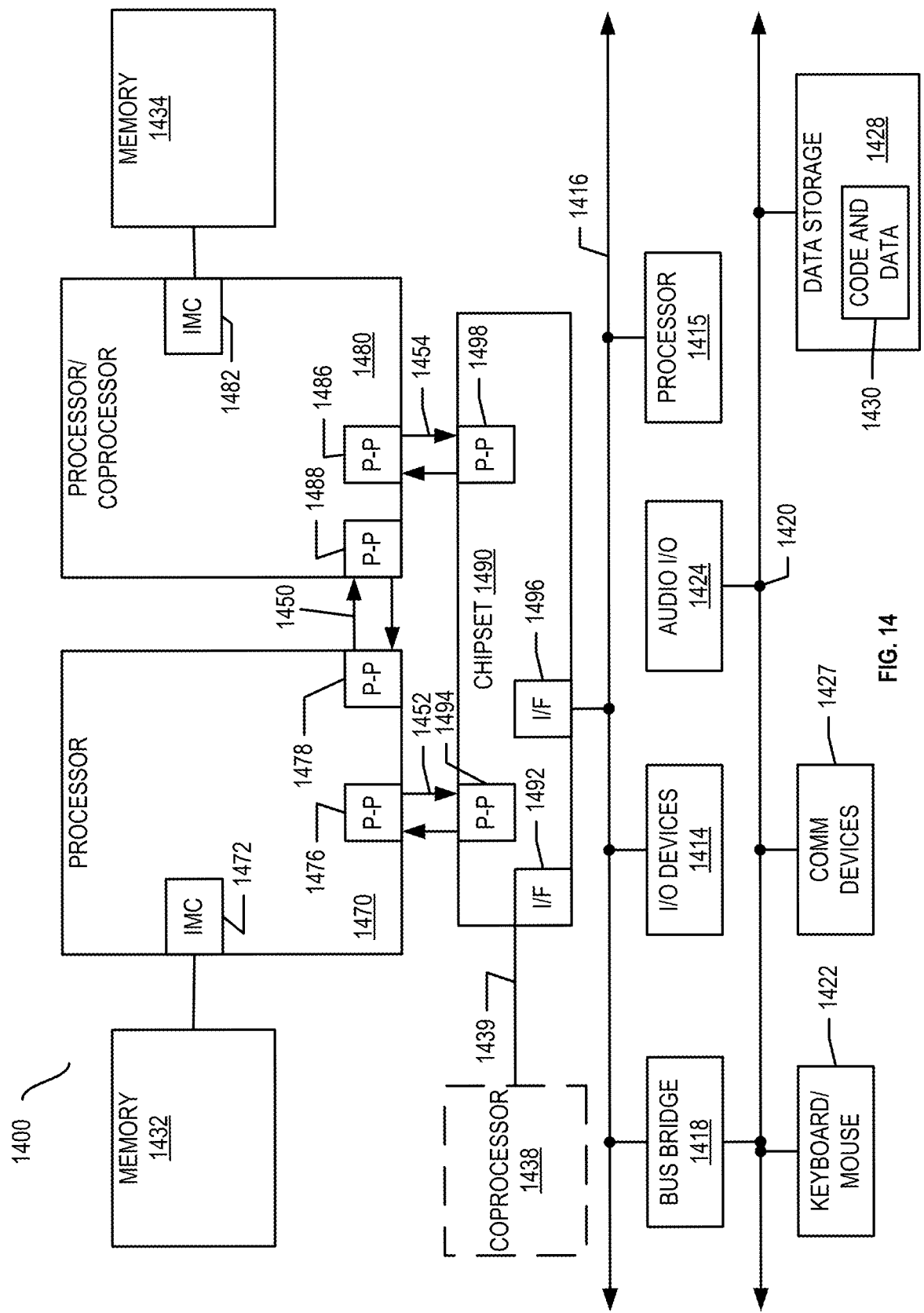
FIG. 14 illustrates a block diagram of a second system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) hardware 1472 and 1482, respectively. Processor 1470 also includes as part of its bus controller hardware point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) hardware), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage hardware 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
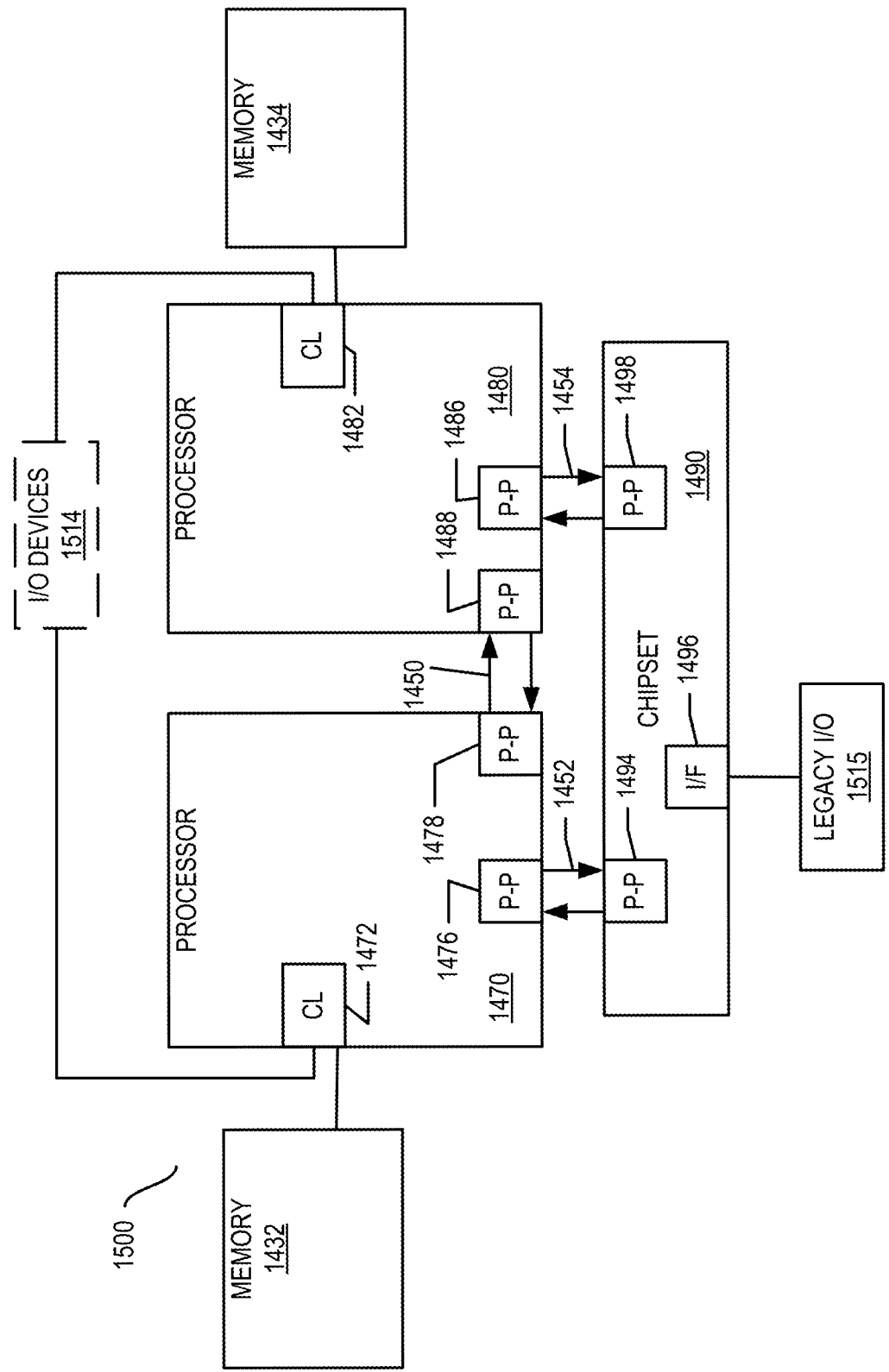
FIG. 15 illustrates a block diagram of a third system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller hardware and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
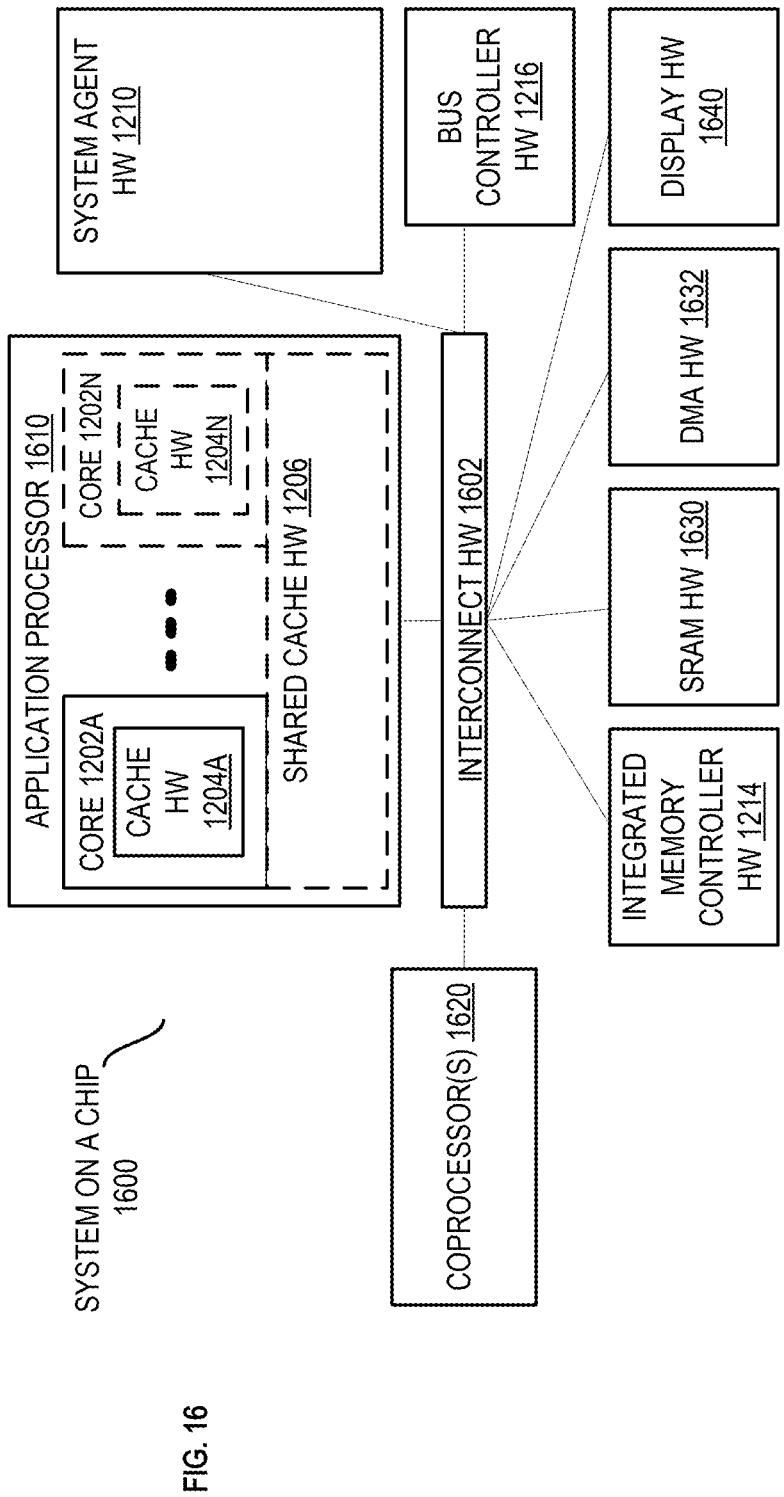
FIG. 16 illustrates a block diagram of a system on a chip (SoC) in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect hardware 1602 is coupled to: an application processor 1610 which includes a set of one or more cores 1202A-N and shared cache hardware 1206; a system agent hardware 1210; a bus controller hardware 1216; an integrated memory controller hardware 1214; a set or one or more coprocessors 1620 which may include integrated graphics logic, an image processor, an audio processor, and a video processor; an static random access memory (SRAM) hardware 1630; a direct memory access (DMA) hardware 1632; and a display hardware 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
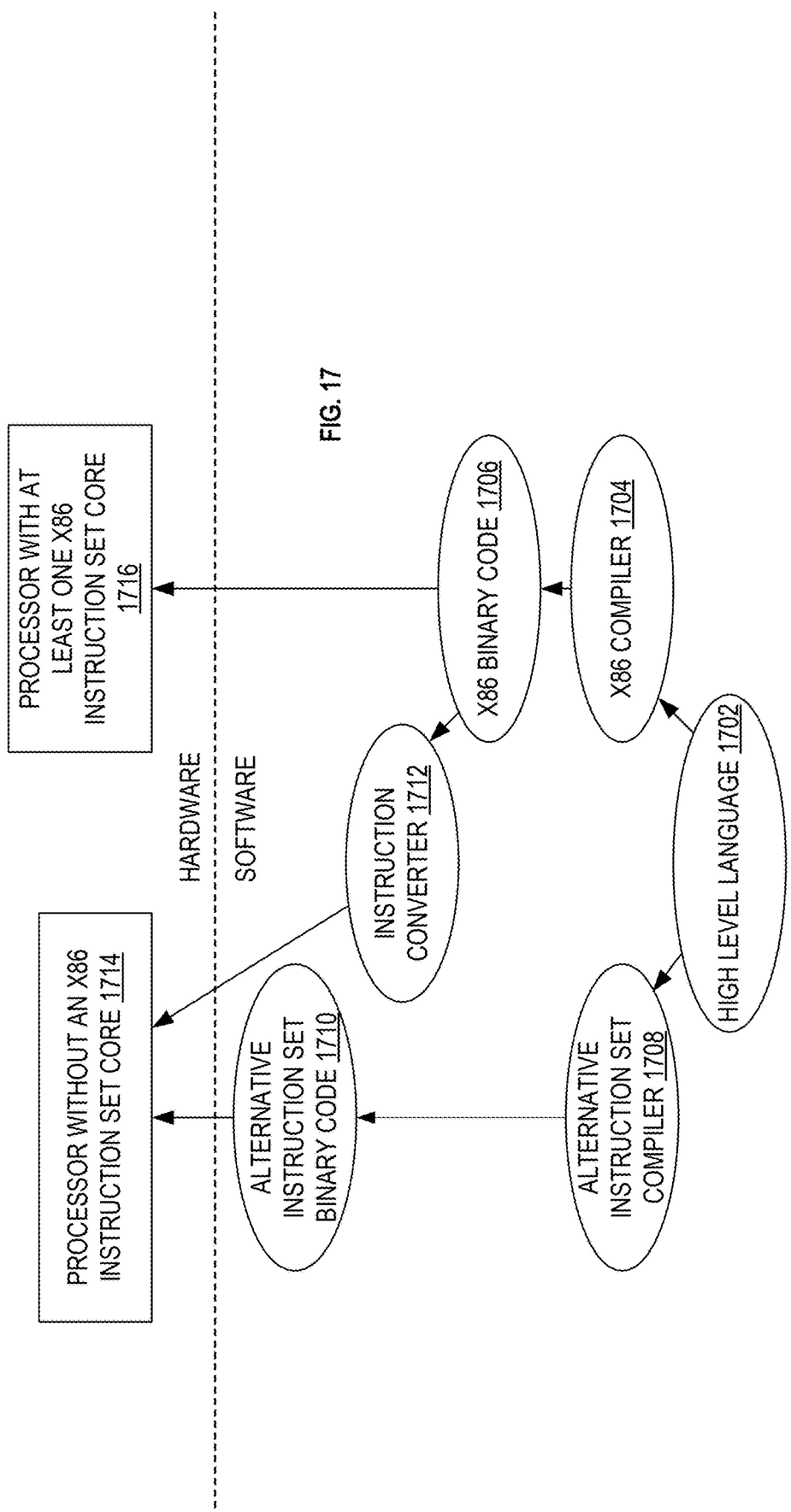
FIG. 17 illustrates a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. An apparatus comprising:
   compression circuitry to perform compression operations on a memory block;
   constant detection circuitry to, concurrently with performance of the compression operations on the memory block, perform constant check operations that comprise a determination of whether the memory block is a constant data block comprised of only repeat instances of a constant value; and
   controller circuitry to associate a first indication with the memory block based on the determination that the memory block is a constant data block, wherein the first indication is usable for controlling whether to abort the compression operations or whether to discard a compressed memory block generated from the compression operations.

2. The apparatus of claim 1, wherein the controller circuitry is to associate the first indication with the memory block by associating the first indication with a memory address of the memory block.

3. The apparatus of claim 1, further comprising:
   fill circuitry to, responsive to a request for the memory block, generate a copy of the memory block using the constant value when the memory block is associated with the first indication.

4. The apparatus of claim 3, further comprising:
   decompression circuitry to, responsive to the request for the memory block, generate the copy of the memory block by decompressing the compressed memory block when the memory block is not associated with the first indication.

5. The apparatus of claim 1, wherein the compression operations comprise at least a first operation to analyze the memory block to generate compression parameters and a second operation to generate the memory block based on the compression parameters.

6. The apparatus of claim 5, wherein the compression circuitry is to abort the second operation responsive to the determination that the memory block is a constant data block.

7. The apparatus of claim 1, further comprising:
   storage unit to store the compressed memory block, the storage unit comprising a system memory or a cache.

8. The apparatus of claim 1, wherein the memory block comprises a memory page.

9. The apparatus of claim 1, wherein the memory block comprises M bits, the constant value comprises N bit, and the memory block comprises M/N occurrences of the constant value.

10. The apparatus of claim 9, wherein N comprises one of 8, 16, and 32.

11. The apparatus of claim 1, wherein the compression operations is performed based on a DEFLATE or a Lempel-Ziv-Oberhumer (LZO) compression scheme.

12. The apparatus of claim 1, wherein the determination that the memory block is a constant data block further comprises dividing the memory block into a plurality of smaller memory blocks and determining that each of the plurality of smaller memory blocks is also comprised of only repeat instances of the constant value.

13. The apparatus of claim 12, wherein the constant value is stored in a state structure and compared with values in each of the plurality of smaller memory blocks.

14. A method comprising:
    performing compression operations on a memory block;
    performing constant check operations that comprise a determination of whether the memory block is a constant data block comprised of only repeat instances of a constant value, wherein the constant check operations are performed concurrently with the compression operations on the memory block; and
    associating a first indication with the memory block based on the determination that the memory block is a constant data block, wherein the first indication is usable for controlling whether to abort the compression operations or whether to discard a compressed memory block generated from the compression operations.

15. The method of claim 14, wherein associating the first indication with the memory block further comprises associating the first indication with a memory address of the memory block.

16. The method of claim 14, further comprises:
    responsive to a request for the memory block, generating a copy of the memory block using the constant value when the memory block is associated with the first indication.

17. The method of claim 16, further comprises:
    responsive to the request for the memory block, generating the copy of the memory block by decompressing the compressed memory block when the memory block is not associated with the first indication.

18. The method of claim 14, wherein the compression operations comprise at least a first operation to analyze the memory block to generate compression parameters and a second operation to generate the memory block based on the compression parameters.

19. The method of claim 18, further comprises:
    aborting the second operation responsive to the determination that the memory block is a constant data block.

20. The method of claim 14, further comprises:
    storing the compressed memory block in a storage unit, the storage unit comprising a system memory or a cache.

21. The method of claim 14, wherein the memory block comprises a memory page.

22. The method of claim 14, wherein the memory block comprises M bits, the constant value comprises N bit, and the memory block comprises M/N occurrences of the constant value.

23. The method of claim 22, wherein N comprises one of 8, 16, and 32.

24. The method of claim 14, wherein the compression operations is performed based on a DEFLATE or a Lempel-Ziv-Oberhumer (LZO) compression scheme.

25. The method of claim 14, wherein determining that the memory block is a constant data block further comprises dividing the memory block into a plurality of smaller memory blocks and determining that each of the plurality of smaller memory blocks is also comprised of only repeat instances of the constant value.

* * * * *